US008895465B2

(12) United States Patent
Luo

(10) Patent No.: US 8,895,465 B2
(45) Date of Patent: Nov. 25, 2014

(54) ACTIVATOR COMPOSITIONS, THEIR PREPARATION, AND THEIR USE IN CATALYSIS

(75) Inventor: Lubin Luo, Houston, TX (US)

(73) Assignee: Albemarle Corporation, Richmond, VA (US)

( * ) Notice: Subject to any disclaimer, the term of this patent is extended or adjusted under 35 U.S.C. 154(b) by 0 days.

(21) Appl. No.: 13/988,886

(22) PCT Filed: Nov. 14, 2011

(86) PCT No.: PCT/US2011/060595
§ 371 (c)(1),
(2), (4) Date: May 22, 2013

(87) PCT Pub. No.: WO2012/071205
PCT Pub. Date: May 31, 2012

(65) Prior Publication Data
US 2013/0253155 A1    Sep. 26, 2013

Related U.S. Application Data

(60) Provisional application No. 61/416,092, filed on Nov. 22, 2010.

(51) Int. Cl.
| | |
|---|---|
| *C08F 4/649* | (2006.01) |
| *C08F 4/642* | (2006.01) |
| *C08F 4/6592* | (2006.01) |
| *C08F 10/00* | (2006.01) |
| *C08F 110/02* | (2006.01) |
| *C08F 210/16* | (2006.01) |
| *B01J 21/04* | (2006.01) |
| *B01J 21/08* | (2006.01) |
| *B01J 21/12* | (2006.01) |
| *B01J 31/02* | (2006.01) |
| *B01J 31/14* | (2006.01) |
| *B01J 31/22* | (2006.01) |

(52) U.S. Cl.
CPC ............ *C08F 110/02* (2013.01); *C08F 210/16* (2013.01); *B01J 21/04* (2013.01); *B01J 21/08* (2013.01); *B01J 21/12* (2013.01); *B01J 31/0202* (2013.01); *B01J 31/0217* (2013.01); *B01J 31/0237* (2013.01); *B01J 31/0254* (2013.01); *B01J 31/143* (2013.01); *B01J 31/2295* (2013.01); *C08F 4/65927* (2013.01); *C08F 2410/01* (2013.01); *Y10S 526/943* (2013.01)
USPC .......... 502/111; 502/114; 502/120; 502/125; 502/152; 526/142; 526/148; 526/160; 526/165; 526/348; 526/943

(58) Field of Classification Search
CPC ........ C08F 4/6428; C08F 4/646; C08F 4/649; C08F 4/65912; C08F 4/65916; C08F 10/00
USPC .......... 502/114, 120, 125, 152; 526/142, 148, 526/160, 165, 348, 943
See application file for complete search history.

(56) References Cited

U.S. PATENT DOCUMENTS

| | | | |
|---|---|---|---|
| 2,864,843 | A | 12/1958 | De Witt et al. |
| 2,983,740 | A | 5/1961 | Thomas et al. |
| 4,665,046 | A | 5/1987 | Campbell, Jr. |
| 4,691,036 | A | 9/1987 | Starzewski et al. |
| 4,716,205 | A | 12/1987 | Klabunde |
| 4,724,273 | A | 2/1988 | Fink et al. |
| 4,874,880 | A | 10/1989 | Miya et al. |
| 4,892,851 | A | 1/1990 | Ewen et al. |
| 4,906,754 | A | 3/1990 | Klabunde |
| 4,931,417 | A | 6/1990 | Miya et al. |
| 4,952,713 | A | 8/1990 | Lilga et al. |
| 5,017,714 | A | 5/1991 | Welborn, Jr. |
| 5,026,798 | A | 6/1991 | Canich |
| 5,030,606 | A | 7/1991 | Klabunde |
| 5,036,034 | A | 7/1991 | Ewen |
| 5,064,802 | A | 11/1991 | Stevens et al. |
| 5,081,231 | A | 1/1992 | Stevens et al. |
| 5,145,817 | A | 9/1992 | Sherrod |
| 5,162,278 | A | 11/1992 | Razavi |
| 5,175,326 | A | 12/1992 | Klabunde |

(Continued)

FOREIGN PATENT DOCUMENTS

| | | |
|---|---|---|
| CA | 2 196 509 | 8/1997 |
| EP | 0 381 495 B1 | 6/1996 |

(Continued)

OTHER PUBLICATIONS

Albemarle Corporation, Ethanox 4702 & 4710, Lubricant Antioxidants, 2005, 2 page brochure.
Albemarle Corporation, Ethanox 330 & 330G, Antioxidant, 2008, 2 page brochure.
Babushkin, D.E., et al., "Activation of Dimethyl Zirconocene by Methylaluminoxane (MAO)-Size Estimate for Me-MAO-Anions by Pulsed Field-Gradient NMR", J. Am. Chem. Soc., 2002, 124, pp. 12869-12873.
Brookhart, M., et al., "Cobalt(III)-Catalyzed Living Polymerization of Ethylene: Routes to End-Capped Polyethylene with a Narrow Molar Mass Distribution", Macromolecules, 1995, 28, pp. 5378-5380.
Bryliakov, K. P., et al., "1H and 13C NMR Spectroscopic Study of Titanium(IV) Species Formed by Activation of Cp2TiCl2 and [(Me4C5)SiMe2NtBu]TiCl2 with Methylaluminoxane (MAO)", Organometallics, 2004, 23, pp. 149-152.

(Continued)

*Primary Examiner* — Caixia Lu
(74) *Attorney, Agent, or Firm* — James A. Jubinsky

(57) ABSTRACT

This invention provides activator precursor compositions and activator compositions. The activator precursor compositions are formed from a support material, an organoaluminum compound, and polyfunctional compounds having at least two aromatic groups in which at least two of said aromatic groups each has at least one polar moiety thereon. The activator compositions are formed from a support material, an organoaluminum compound, an aluminoxane, and a polyfunctional compound having at least two aromatic groups in which at least two of said aromatic groups each has at least one polar moiety thereon. Also provided are catalyst compositions, processes for forming catalyst compositions, and polymerization processes utilizing the catalyst compositions of this invention.

18 Claims, No Drawings

(56) References Cited

U.S. PATENT DOCUMENTS

| | | |
|---|---|---|
| 5,245,019 A | 9/1993 | Conroy et al. |
| 5,268,495 A | 12/1993 | Riepl et al. |
| 5,276,208 A | 1/1994 | Winter et al. |
| 5,304,523 A | 4/1994 | Razavi |
| 5,324,800 A | 6/1994 | Welborn, Jr. et al. |
| 5,329,031 A | 7/1994 | Miyake et al. |
| 5,329,033 A | 7/1994 | Spaleck et al. |
| 5,330,948 A | 7/1994 | Marks et al. |
| 5,347,025 A | 9/1994 | Yamada et al. |
| 5,347,026 A | 9/1994 | Patsidis et al. |
| 5,347,752 A | 9/1994 | Black |
| 5,516,739 A | 5/1996 | Barborak et al. |
| 5,554,775 A | 9/1996 | Krishnamurti et al. |
| 5,561,216 A | 10/1996 | Barborak et al. |
| 5,637,660 A | 6/1997 | Nagy et al. |
| 5,714,556 A | 2/1998 | Johnson et al. |
| 5,756,611 A | 5/1998 | Etherton et al. |
| 5,866,663 A | 2/1999 | Brookhart et al. |
| 5,880,241 A | 3/1999 | Brookhart et al. |
| 5,880,323 A | 3/1999 | Brookhart, III et al. |
| 5,932,514 A | 8/1999 | Ernst et al. |
| 6,020,493 A | 2/2000 | Liu |
| 6,069,108 A | 5/2000 | Ernst et al. |
| 6,114,483 A | 9/2000 | Coughlin et al. |
| 6,225,252 B1 | 5/2001 | Ernst et al. |
| 6,284,699 B1 | 9/2001 | Ohgane et al. |
| 6,500,906 B1 | 12/2002 | Kong et al. |
| 7,166,682 B2 | 1/2007 | Lindroos et al. |
| 7,199,071 B2 | 4/2007 | Zheng et al. |
| 8,354,485 B2 | 1/2013 | Luo et al. |
| 2005/0245701 A1 | 11/2005 | Oshima et al. |
| 2007/0123665 A1* | 5/2007 | Jacobsen et al. ............. 526/127 |

FOREIGN PATENT DOCUMENTS

| | | |
|---|---|---|
| EP | 0 787 746 B1 | 8/1999 |
| EP | 0 805 826 B1 | 4/2003 |
| JP | 09-272709 | 10/1997 |
| WO | 97/02298 A1 | 1/1997 |
| WO | 97/17380 A2 | 5/1997 |
| WO | 98/32776 A1 | 7/1998 |
| WO | 98/40374 A2 | 9/1998 |
| WO | 99/55737 A1 | 11/1999 |
| WO | 00/11006 A1 | 3/2000 |
| WO | 01/25296 A1 | 4/2001 |
| WO | 2005/066191 A1 | 7/2005 |
| WO | 2007/005364 A2 | 1/2007 |
| WO | 2007/131010 A2 | 11/2007 |
| WO | 2008/036594 A2 | 3/2008 |
| WO | 2009/029857 A1 | 3/2009 |

OTHER PUBLICATIONS

Johnson, L.K., et al., "New Pd(II)- and Ni(II)-Based Catalysts for Polymerization of Ethylene and a-Olefins", J. Am. Chem. Soc., 1995, 117, pp. 6414-6415.

Klosin, J., et al., "Ligand Exchange and Alkyl Abstraction Involving (Perfluoroaryl)boranes and -alanes with Aluminum and Gallium Alkyls", Organometallics, 2000, 19, pp. 4684-4686.

Mashima, K., "New Iron- and Cobalt Catalysts for Polymerization of Ethylene", Catalysts and Catalysis, Shokubai, 1999, 41(1), 3 pages including a CAPLUS Abstract.

Matsui, S., et al., "Post-Metallocenes: Catalytic Performance of New Bis(salicyladiminato) Zirconium Complexes for Ethylene Polymerization", Chemistry Letters, 2000, pp. 554-555.

Sarzotti, D.M., et al., "A Kinetic Study of Metallocene-Catalyzed Ethylene Polymerization Using Different Aluminoxane CoCatalysts", J. Polym. Sci. Part A: Polym Chem 45, 2007, pp. 1677-1690.

Schmidt, G.F., et al., "Implications of Three-Center, Two-Electron M-H-C Bonding for Related Alkyl Migration Reactions: Design and Study of an Ethylene Polymerization Catalyst", J. Am. Chem. Soc., 1985, 107, pp. 1443-1444.

Starzewski, K. A. O., et al., "Control of the Molecular Weight of Polyethene in Syntheses with Bis(ylide)nickel Catalysts", Angew. Chem. Int. Ed. Engl., 1987, 26(1), pp. 63-64.

* cited by examiner

ACTIVATOR COMPOSITIONS, THEIR PREPARATION, AND THEIR USE IN CATALYSIS

REFERENCE TO RELATED APPLICATIONS

This application is the National Stage of International Patent Appl. No. PCT/US2011/060595 filed on Nov. 14, 2011, which in turn claims the benefit of U.S. Provisional Patent Appl. No. 61/416,092, filed on Nov. 22, 2010, the disclosures of which are incorporated herein by reference.

TECHNICAL FIELD

This invention relates to new activator precursor compositions, activator compositions, their preparation, and their use in catalysts for olefin polymerization.

BACKGROUND

Partially hydrolyzed aluminum alkyl compounds known as aluminoxanes (also called alumoxanes) are effective in activating metallocenes for polymerization of olefins. Methylaluminoxane (also called methylalumoxane) has become the aluminum co-catalyst of choice in the industry. It is available commercially in the form of 10 to 30 wt % solutions in an aromatic solvent, typically toluene.

Considerable effort has been devoted to improving the effectiveness of catalyst systems for polymerization of olefins based on use of aluminoxanes or modified aluminoxanes. In this connection, WO 2009/029857 shows dimethylaluminum cation formation from methylaluminoxane upon treatment of methylaluminoxane with a Lewis base. e.g., tetrahydrofuran, in a toluene solution. Lewis base stabilized dialkylaluminum cations can also be derived from non-aluminoxane sources and used as metallocene catalyst activators; see for example Klosin et al., WO 2000/011006, and *Organometallics*, 2000, 19, 4684-4686. When a methylaluminoxane is reacted with a metallocene, a metallocene-dialkylaluminum cation forms, for example, $[Cp_2Zr(\mu\text{-}Me)_2AlMe_2]^+$ or $[Cp_2Ti(\mu\text{-}Me)_2AlMe_2]^+$. See in this connection Babushkin and Brintzinger, *J. Am. Chem. Soc.*, 2002, 124, 12869-12873, and Sarzotti et al., *J. Polymer Sci. A*, 2007, 45, 1677-1690, which describe activation of a zirconocene catalyst precursor by methylaluminoxane; also see Bryliakov, Talsi, and Bochmann, *Organometallics*, 2004, 23, 149-152, which describes activation of a titanocene catalyst precursor by methylaluminoxane.

Silica-supported methylaluminoxane is currently a preferred commercial metallocene catalyst activator. However, silica-supported methylaluminoxane can only activate a small amount of metallocene, resulting a relatively low efficiency for such systems. Low efficiency is believed to be caused by a need for a large excess of methylaluminoxane (e.g., an atomic ratio of Al:Zr greater than 400:1) to effectively activate the metallocene molecules, and/or by the small amount of methylaluminoxane that can be supported on standard grades of silica (e.g., <20% Al).

Improvements to aluminoxanes are continually sought in the art, particularly to increase their stability and/or activation efficiencies.

SUMMARY OF THE INVENTION

This invention relates to novel activator precursor compositions and activator compositions, which provide catalyst systems having high efficiency. Such compositions typically are stable under inert, anhydrous conditions, and are usually in solid form. In addition to these desirable features, the compositions of the invention also perform significantly better than typical supported aluminoxanes when used as cocatalysts in the polymerization of olefins. More particularly, the resulting activator compositions of this invention interact with metallocenes to yield highly active catalyst systems. For example, a catalyst system of this invention gives aluminum loadings controllable in a range comparable to or nearly 60% more than a system activated with a commercially available supported methylaluminoxane, and a productivity increase of more than 200-400% compared to such systems activated with a commercially-available supported methylaluminoxane.

An embodiment of this invention is an activator precursor composition which comprises
i) a support material in contact with an organoaluminum compound, and
ii) a polyfunctional compound.
The polyfunctional compounds have at least two aromatic groups, and at least two of the aromatic groups each has at least one polar monoprotic group thereon.

Another embodiment of this invention is an activator composition which comprises an aluminoxane and an activator precursor composition described above.

Also provided by this invention are processes for forming activator precursor compositions, activator compositions, and catalyst compositions, as well as catalyst compositions, polymerization processes utilizing the catalyst compositions of this invention, and polymers formed thereby.

These and other embodiments and features of this invention will be still further apparent from the ensuing description and appended claims.

FURTHER DETAILED DESCRIPTION OF THE INVENTION

It is preferred that the components used in forming the activator precursor compositions and activator compositions as well as the resultant activator precursor compositions and activator compositions themselves be handled in an inert, moisture-free, oxygen free environment such as argon, nitrogen, or helium because of the sensitivity of such components and compositions to moisture and oxygen.

Operations involving forming and/or handling of the activator precursor compositions of this invention and the activator compositions of this invention are usually performed in an inert, anhydrous environment. Typically, the inert, anhydrous environment is an anhydrous liquid hydrocarbon solvent, preferably an aromatic hydrocarbon. Suitable aliphatic hydrocarbons include, but are not necessarily limited to, isobutane, butane, pentane, hexane, cyclopentane, methylcyclopentane, cyclohexane, methylcyclohexane, heptane, cycloheptane, octane, isooctane, and the like. Aromatic hydrocarbons usually include one or more of benzene, toluene, xylene, mesitylene, ethylbenzene, diethylbenzene, 1,2,4-triethylbenzene, 1,3,5-triethylbenzene, amylbenzene, tetrahydronaphthalene, and the like. Mixtures of solvents may be used. Toluene is a particularly preferred aromatic solvent.

Compositions of the Invention

The components described herein are used in forming the activator precursor compositions and activator compositions of the invention. It is to be understood that the components, when part of an activator precursor composition or activator composition of the invention, are not in the same form as they were before they became part of the activator precursor composition or the activator composition, although the compositions are generally described herein in terms of unmodified components. For example, the organoaluminum compounds may form organoaluminum moieties, and the polyfunctional compounds may form polyfunctional groups comprising at least two aromatic groups, in which at least two of the aromatic groups each has at least one polar group thereon.

Activator Precursor Compositions

Activator precursor compositions of the invention are comprised of i) a support material in contact with an organoaluminum compound, sometimes referred to herein as an organoaluminum-treated support, and ii) a polyfunctional compound which has at least two aromatic groups in which at least two of said aromatic groups each has at least one polar monoprotic group thereon. The support material, organoaluminum compound, and polyfunctional compound are as described below, although it is to be understood that these components may not be in the same form as they were before they became part of the activator precursor composition. Activator precursor compositions of this invention can be produced by the processes described below.

Support Material

The support material can be organic or inorganic. Support materials used in the practice of this invention may be any finely divided inorganic solid support, such as talc, clay, silica, alumina, silica-alumina, magnesium chloride, or mixtures thereof, or a particulate resinous support material such as spheroidal, particulate, or finely-divided polyethylene, polyvinylchloride, polystyrene, or the like. Preferred support materials are inorganic particulate solid catalyst supports or carrier materials such as magnesium halides, or the like, and particularly inorganic oxides, aluminum silicates, or inorganic compositions containing inorganic oxides, such as kaolinite, attapulgite, montmorillonite, illite, bentonite, halloysite, and similar refractory clays. More preferred support materials are inorganic oxides, especially silica, alumina, and silica-alumina. Particularly preferred as the support material is particulate silica, especially porous particulate silica. Inorganic oxides that may be employed either alone or in combination with silica, alumina, or silica-alumina are magnesia, titania, zirconia, and the like.

Optionally, the support material be fully or, preferably, partially dehydrated to remove water. The support material may be dehydrated by heating at 100 to 1000° C., preferably 100° C. to about 600° C., for a period of 1 to about 100 hours, preferably about 3 to about 24 hours. The treatment may be carried out in a vacuum or while purging with a dry inert gas such as nitrogen. As an alternative, the support material may be chemically dehydrated. Chemical dehydration is accomplished by slurrying the support in an inert low boiling solvent such as, for example, heptane, in a moisture- and oxygen-free atmosphere, in the presence of a dehydrating agent such as for example, trimethylaluminum.

For combination with the organoaluminum compound, the support should have organoaluminum-reactive polar groups (functional groups), which typically have electron rich donor sites such as halogen, oxygen, sulfur, phosphorus, and nitrogen heteroatoms, or are sites containing one or more of these atoms, as well as double bonds. Examples of such polar groups include, but are not limited to, —OH groups, —NH groups, —SH groups, highly strained rings containing heteroatoms (e.g., those from the high temperature (~600 to 1000° C.) calcined support material that forms moieties such as four-member —Si—O—Si—O— rings), carbonyl groups, carbon-carbon double bonds, and the like. Generally, the polar groups are those that can form IUPAC standard sigma bonds upon reaction with the organoaluminum compound.

The support material can serve as a template to regulate the particle sizes of the activator precursor compositions and/or activator compositions, which in turn influences catalyst and polymer morphologies. Thus, the specific particle size of the support material is frequently taken into consideration in choosing a support material. A suitable support such as silica typically will have a particle diameter in the range of 0.1 to 600 microns, preferably in the range of 0.3 to 100 microns; a surface area in the range of 50 to 1000 $m^2/g$, preferably in the range of 100 to 500 $m^2/g$; and a pore volume in the range of about 0.3 to 5.0 cc/g, preferably in the range of 0.5 to 3.5 cc/g. It is also desirable to employ supports with pore diameters in the range of about 50 to about 500 angstroms.

Organoaluminum Compounds

As used throughout this document, the term "organoaluminum compound" refers to compounds of the formula $Z_{3-f}AlR_f$ in which
  Al is aluminum;
  R is a hydrogen atom or a group bound to aluminum via a carbon atom (usually a hydrocarbyl group);
  Z is an atom or group that is bound to aluminum via a non-carbon atom; and
  f is a number from 2 to 3.

The organoaluminum compound can be a single compound having f=2 or 3, or a mixture of organoaluminum compounds. Mixtures of any two or more organoaluminum compounds can be used in any relative proportions to each other in the practice of this invention. For example, mixtures of organoaluminum compounds where some of the organoaluminum compounds have f=2 and some have f=3 can be used. It is known in the art that mixing $AlR_3$ and $AlR_2$ generates $AlR_2Z$, which is then also present in the mixture. Another way of expressing this is that f may have fractional values between 2 and 3. Such mixtures are considered suitable for use in this invention. For example, when one equivalent of methylaluminum dichloride is mixed with one equivalent of trimethylaluminum, scrambling occurs, and the majority of the resulting compound mixture is dimethylaluminum chloride.

Normally and preferably, at least a portion of organoaluminum compound has f=3 (i.e., $AlR_3$) is used; preferably about 0.1 mol % or more of an organoaluminum compound with f=3 is used. Preferably, in the range of about 1 mol % to about 99 mol %, more preferably about 25 mol % to about 99 mol %, still more preferably about 50 mol % to about 99 mol %, and even more preferably, about 75 mol % to about 99 mol % of an organoaluminum compound with f=3 is present. Preferably, one or more organoaluminum compounds with f=3 are used; more preferably, one organoaluminum compound with f=3 is used.

Each R in the formula $Z_{3-f}AlR_f$ is, independently, a hydrogen atom or a hydrocarbyl group. Preferably, at least one R is a hydrocarbyl group. When there are two or three hydrocarbyl groups in the organoaluminum compound, the hydrocarbyl groups may be the same or different. It is usually preferred that all of the hydrocarbyl groups in the organoaluminum compound are the same. Preferred hydrocarbyl groups in the organoaluminum compounds have from one to about twenty carbon atoms; more preferred are hydrocarbyl groups which have from one to about six carbon atoms; it is also preferred that these hydrocarbyl groups are alkyl groups.

In the formula $Z_{3-f}AlR_f$, Z is an atom or group that is bound to aluminum via a non-carbon atom. Suitable moieties for Z in the formula $Z_{3-f}AlR_f$ typically include, but are not limited to, halogen atoms, hydrocarbyloxy and halohydrocarbyloxy groups, hydrocarbylthio and halohydrocarbylthio groups and dihydrocarbylamide groups. When Z is a halogen atom, it is a fluorine atom, chlorine atom, bromine atom, or iodine atom; preferably, the halogen atom is a chlorine atom or a fluorine atom; more preferably, the halogen atom is a fluorine atom. For Z, the hydrocarbyloxy, halohydrocarbyloxy, hydrocarbylthio, and halohydrocarbylthio groups have one to about twenty carbon atoms, preferably about one to about eight carbon atoms, and are preferably alkoxy or aryloxy groups. When Z is a halohydrocarbyloxy group or a halohydrocarbylthio group, it can have from one halogen atom to perhalogenation, with perhalogenation preferred; the halogen can be fluorine, chlorine, bromine, or iodine, preferably chlorine or fluorine, more preferably fluorine. Preferred hydrocarbyloxy groups and halohydrocarbyloxy groups include methoxy, phenoxy, and pentafluorophenyl groups. Preferred hydrocarbylthio groups and halohydrocarbylthio groups include methylthio, phenylthio, and pentafluorophenyl groups. When Z is a dihydrocarbylamide group, the hydrocarbyl groups thereof have one to about twenty carbon atoms, preferably one to about twelve carbon atoms, and the hydrocarbyl groups are preferably alkyl or aryl, more preferably alkyl. A preferred dihydrocarbylamide group is dimethylamide.

Suitable organoaluminum compounds in which f=3 that can be used in the practice of this invention include, but are not limited to, aluminum hydride, dimethylaluminum hydride, trimethylaluminum, diethylaluminum hydride, triethylaluminum, dimethylethylaluminum, diethylmethylaluminum, di-n-propylaluminum hydride, tri-n-propylaluminum, triisopropylaluminum, tri-n-butylaluminum, diisobutylaluminum hydride, triisobutylaluminum, diisobutylethylaluminum, tri-tert-butylaluminum, tri-3-methylbutylaluminum, tripentylaluminum, tricyclopentylaluminum, di-n-hexylaluminum hydride, tri-n-hexylaluminum, triisohexylaluminum, bis(3-methylpentyl)aluminum hydride, tris(3-methylpentyl)aluminum, tris(4-methylpentyl)aluminum, tris(2-methylhexyl)aluminum, tris(3-methylhexyl)aluminum, tris(2-ethylhexyl)aluminum, dicyclohexylaluminum hydride, tricyclohexylaluminum, tris(methylcyclohexyl)aluminum, diheptylaluminum hydride, triheptylaluminum, di-n-octylaluminum hydride, tri-n-octylaluminum, tri-n-decylaluminum, tridodecylaluminum, tris(tetradecyl)aluminum, tris(hexadecyl)aluminum, tris(octadecyl)aluminum, diphenyl-aluminum hydride, triphenylaluminum, ditolylaluminum hydride, tritolylaluminum, tris(3,5-dimethylphenyl)aluminum, tris(2,4-diisopropylphenyl)aluminum, tris(biphenylyl)-aluminum, diphenyl(methyl)aluminum hydride, dimethyl(phenyl)aluminum, ethyl-methylphenylaluminum, tri-α-naphthylaluminum, and tri-β-naphthylaluminum, as well as mixtures of two or more of the foregoing compounds.

Suitable organoaluminum compounds in which f<3 and in which Z is a halogen atom that can be used in the practice of this invention include, but are not limited to, methylaluminum difluoride, dimethylaluminum fluoride, ethylaluminum difluoride, diethylaluminum fluoride, isopropylaluminum difluoride, diisopropylaluminum fluoride, n-butylaluminum difluoride, isobutylaluminum difluoride, diisobutylaluminum fluoride, dipentylaluminum fluoride, cyclohexylaluminum difluoride, diheptylaluminum fluoride, dicyclooctylaluminum fluoride, nonylaluminum difluoride, decylaluminum difluoride, diundecylaluminum fluoride, phenylaluminum difluoride, diphenylaluminum fluoride, tolylaluminum difluoride, ditolylaluminum fluoride, methylaluminum dichloride, dimethylaluminum chloride, ethylaluminum dichloride, diethylaluminum chloride, diisopropylaluminum chloride, di-n-butylaluminum chloride, isobutylaluminum dichloride, pentylaluminum dichloride, dicyclohexylaluminum chloride, heptylaluminum dichloride, cyclooctylaluminum chloride, dinonylaluminum chloride, didecylaluminum chloride, undecylaluminum chloride, phenylaluminum dichloride, diphenylaluminum chloride, tolylaluminum dichloride, ditolylaluminum chloride, methylaluminum dibromide, dimethylaluminum bromide, ethylaluminum dibromide, diethylaluminum bromide, isopropylaluminum dibromide, isobutylaluminum dibromide, diisobutylaluminum bromide, pentylaluminum bromide, cyclohexylaluminum bromide, heptylaluminum dibromide, cyclooctylaluminum bromide, dinonylaluminum bromide, decylaluminum dibromide, undecylaluminum bromide, phenylaluminum dibromide, diphenylaluminum bromide, tolylaluminum dibromide, ditolylaluminum bromide, and the like, as well as mixtures of two or more of the foregoing compounds.

Suitable organoaluminum compounds in which f<3 and in which Z is a hydrocarbyloxy or halohydrocarbyloxy group that can be used in the practice of this invention include, but are not limited to, dimethylaluminum methoxide, dimethylaluminum phenoxide, dimethylaluminum pentafluorophenoxide, diethylaluminum trifluoromethoxide, diethylaluminum phenoxide, diethylaluminum pentafluorophenoxide, isopropylaluminum diethoxide, isopropylaluminum diphenoxide, isopropylaluminum dipentafluorophenoxide, diisopropylaluminum methoxide, diisopropylaluminum tolyloxide, diisopropylaluminum trifluoromethoxide, diisobutylaluminum propoxide, diisobutylaluminum trichloromethoxide, diisobutylaluminum cyclopentoxide, dipentylaluminum ethoxide, dipentylaluminum tolyloxide, dipentylaluminum pentafluorophenoxide, diheptylaluminum methoxide, diheptylaluminum cyclohexoxide, diheptylaluminum trifluoromethoxide, dicyclooctylaluminum methoxide, dicyclooctylaluminum phenoxide, dicyclooctylaluminum pentafluorophenoxide, diundecylaluminum tolyloxide, diundecylaluminum trifluoromethoxide, diphenylaluminum methoxide, diphenylaluminum phenoxide, diphenylaluminum pentafluorophenoxide, ditolylaluminum methoxide, ditolylaluminum phenoxide, and ditolylaluminum pentafluorophenoxide, as well as mixtures of two or more of the foregoing compounds.

Suitable organoaluminum compounds in which f<3 and in which Z is a hydrocarbylthio or halohydrocarbylthio group that can be used in the practice of this invention include, but are not limited to, dimethylaluminum thiomethoxide, dimethylaluminum thiophenoxide, dimethylaluminum pentafluorothiophenoxide, diethylaluminum trifluorothiomethoxide, diethylaluminum thiophenoxide, diethylaluminum pentafluorothiophenoxide, isopropylaluminum dithioethoxide, isopropylaluminum dithiophenoxide, isopropylaluminum dipentafluorothiophenoxide, diisopropylaluminum thiomethoxide, diisopropylaluminum thiotolyloxide, diisopropylaluminum trifluorothiomethoxide, diisobutylaluminum thiopropoxide, diisobutylaluminum trichlorothiomethoxide, diisobutylaluminum thiocyclopentoxide, dipentylaluminum thioethoxide, dipentylaluminum thiotolyloxide, dipentylaluminum pentafluorothiophenoxide, diheptylaluminum thiomethoxide, diheptylaluminum thiocyclohexoxide, diheptylaluminum trifluorothiomethoxide, dicyclooctylaluminum thiomethoxide, dicyclooctylaluminum thiophenoxide, dicyclooctylaluminum pentafluorothiophenoxide, diundecylaluminum thiotolyloxide, diundecylaluminum trifluorothiomethoxide, diphenylaluminum thiomethoxide, diphenylaluminum thiophenoxide, diphenylaluminum pentafluorothiophenoxide, ditolylaluminum thiomethoxide, ditolylaluminum thiophenoxide, and ditolylaluminum pentafluorothiophenoxide, as well as mixtures of two or more of the foregoing compounds.

Suitable organoaluminum compounds in which f<3 and in which Z is a dihydrocarbylamido group that can be used in the practice of this invention include, but are not limited to, dimethylaluminum dimethylamide, dimethylaluminum diphenylamide, diethylaluminum dimethylamide, isopropylaluminum bis(diethylamide), diisopropylaluminum di-n-propylamide, diisobutylaluminum diphenylamide, dipentylaluminum dicyclohexylamide, diheptylaluminum ditolylamide, dicyclooctylaluminum dimethylamide, diundecylaluminum diphenylamide, diphenylaluminum dimethylamide, and ditolylaluminum diphenylamide, as well as mixtures of two or more of the foregoing compounds.

Preferred organoaluminum compounds are those in which f=3, and include trimethylaluminum, tri-n-propylaluminum, tri-n-butylaluminum, tri(isobutyl)aluminum, and mixtures of two or more of these. More preferred are trimethylaluminum and tri(isobutyl)aluminum; most preferred is trimethylaluminum.

Polyfunctional Compound

The polyfunctional compound has at least two aromatic groups, in which at least two of the aromatic groups each has at least one polar monoprotic group thereon. The aromatic groups can be homocyclic or heterocyclic, monocyclic or multicyclic. The polar monoprotic groups need not be sterically hindered, although hydrocarbyl groups can be present on the aromatic rings, including groups that sterically hinder the polar monoprotic group. Aromatic groups that do not have a polar monoprotic group can be present in the polyfunctional compound, so long as there are a minimum of two aromatic groups which do contain at least one polar monoprotic group in the molecule. The term "heterocyclic" as used herein refers to aromatic groups in which one or more heteroatoms (e.g., oxygen, sulfur, and/or nitrogen), preferably from one to four heteroatoms, more preferably one to two heteroatoms, are present. The aromatic rings can be multicyclic, either as fused rings (a moiety based on e.g., naphthylene) or rings which are partially hydrogenated (a moiety based on e.g., tetrahydronaphthylene).

In some embodiments, homocyclic aromatic groups have six or more carbon atoms, preferably in the range of six to about 24 carbon atoms, and more preferably in the range of six to about fifteen carbon atoms. In other embodiments, the aromatic group is a heterocyclic aromatic moiety having five or more non-hydrogen atoms, in which one or more of the aromatic ring atoms is an element other than carbon, such as nitrogen, oxygen, or sulfur. When the aromatic rings are homocyclic, the polyfunctional compound generally has twelve to about sixty carbon atoms in the molecule, preferably about thirteen to about fifty-two carbon atoms, and more preferably about thirteen to about thirty carbon atoms.

In some embodiments of the invention, the polyfunctional compound can be represented by the formula $E(ArJH)_g$, where E is an organic moiety, an atom, or a bond;
Ar is an aromatic moiety;
J is a polar atom or a polar group;
H is a hydrogen atom;
g is an integer equal to or greater than 2;
and each ArJH can be same or different.

In the polyfunctional compound, the at least two aromatic groups each having at least one polar monoprotic group thereon can be linked by an organic moiety, an atom, or a bond. When these aromatic groups are linked by an organic moiety, the organic moiety has from one to about twenty carbon atoms, preferably one to about twelve carbon atoms, and can be an aliphatic or aromatic moiety. One or more heteroatoms can be present in the organic moiety, generally nitrogen, oxygen, or sulfur. Suitable organic moieties for joining the aromatic groups having the polar monoprotic groups thereon include, but are not limited to, methine, methylene, ethylene, propylidene, isopropylidene, butylidene, pentylidene, hexylidene, substituted or unsubstituted saturated cyclic moieties such as cyclohexylidene, substituted or unsubstituted phenylene, benzylic moieties (e.g., $C_6Me_3(CH_2-)_3$), and other substituted or unsubstituted aromatic moieties derived from benzene, naphthylene, anthracene, pyridine, and the like. Preferred organic moieties include aromatic moieties and methylene groups. When the aromatic groups having the polar monoprotic groups thereon are joined by an atom, it can be carbon, silicon, nitrogen, phosphorus, oxygen, or sulfur; preferably, a nitrogen atom or an oxygen atom. In the embodiments in which the polyfunctional compound is represented by the formula above, the organic moiety, bond, or atom linking the aromatic groups having the polar monoprotic groups thereon is represented by E.

Suitable homocyclic aromatic moieties for the aromatic groups with at least one polar monoprotic group thereon include substituted or unsubstituted aromatic moieties having structures based on benzene, naphthalene, anthracene, pyridine, pyrazine, furan, pyrrole, oxadiazole, thiazole, thiophene, indole, quinoline, and the like.

Suitable heterocyclic aromatic moieties for the aromatic groups with at least one polar monoprotic group thereon include substituted or unsubstituted aromatic moieties having structures based on pyridine, pyridazine, imidazole, pyrimidine, pyrazole, triazole, pyrazine, quinoline, isoquinoline, tetrazole, furan, thiene, isoxazole, thiazole, oxazole, isothiazole, pyrrole, indole, benzimidazole, benzofuran, cinnoline, indazole, indolizine, phthalazine, triazine, isoindole, purine, oxadiazole, thiadiazole, furazan, benzofurazan, benzothiophene, benzotriazole, benzothiazole, benzoxazole, quinazoline, quinoxaline, naphthyridine, dihydroquinoline, tetrahydroquinoline, dihydroisoquinoline, tetrahydroisoquinoline, benzofuran, furopyridine, pyrrolopyrimidine, and azaindole.

Monocyclic aromatic moieties are preferred; preferred monocyclic aromatic moieties include those based on benzene rings. Homocyclic aromatic moieties are also preferred.

Ar in the above formula is the aromatic portion corresponding to the aromatic rings of the aromatic groups having the polar monoprotic groups thereon. In other words, in some embodiments, ArJH represents the aromatic group with at least one polar monoprotic group thereon.

In the polyfunctional compound, the polar monoprotic group is a hydroxy group, a thiol group, or a secondary amino group; preferably a hydroxy group or a secondary amino group; more preferably a hydroxy group. When the polar monoprotic group is a secondary amino group (—NR'), R' is a hydrocarbyl group having one to about twenty carbon atoms, preferably one to about eight carbon atoms; and R' is preferably an alkyl group. Analogously, in the embodiments for which the above formula represents the polyfunctional compound, J is a polar atom or a polar group, including —O, —S, or —NR', preferably —O or —NR; more preferably —O; wherein —NR', R' is a hydrocarbyl group having one to about twenty carbon atoms, preferably one to about eight carbon atom; and R' is preferably an alkyl group. In the above formula, the polar monoprotic group of the polyfunctional compound is represented by JH. In these embodiments, although JH need not be sterically hindered, alkyl groups can be present in the aromatic groups, including alkyl groups that sterically hinder the polar monoprotic group.

Aromatic polyols are a preferred type of polyfunctional compound. While the polar monoprotic group need not be sterically hindered, alkyl groups can be present in the aromatic groups, including alkyl groups that sterically hinder the polar monoprotic group.

There are at least two aromatic groups each having at least one polar monoprotic group thereon in the polyfunctional compound. The number of aromatic groups having at least one polar monoprotic group thereon is preferably in the range of 2 to about 6; more preferably in the range of 2 to about 4; especially preferred are polyfunctional compounds with 2 to about 3 aromatic groups each having at least one polar monoprotic group thereon are. Having more than 6 aromatic groups each having at least one polar monoprotic group thereon is within the scope of the invention.

For embodiments in which the polyfunctional compound is represented by the above formula, values for g in the range of 2 to about 6 are preferred; more preferred are values in the range of 2 to about 4; values in the range of 2 to about 3 are especially preferred. Values for g above 6 are possible. When g=2, E can be an atom-to-atom bond. For example, when the polyfunctional compound is 4,4'-diphenol, E is the bond between the two aromatic rings.

Suitable polyfunctional compounds in the practice of this invention in which the aromatic groups are homocyclic include 2,2'-diphenol, 4,4'-diphenol, 3,4'-diphenol, 2,2'-methylenebis(phenol), 4,4'-methylenebis-(phenol), 4,4'-ethylenediphenol, 2-(2-hydroxy-5-methylphenyl)-4-methylphenol, 6,6'-methylenebis(2-tert-butyl-4-methylphenol), 6,6'-(1-ethylidene)bis(2,4-di(tert-butyl)-phenol), 4,4'-methylenebis (2,6-di(tert-butyl)-phenol) (Ethanox® 4702 antioxidant, Albemarle Corporation), 4,4'-isopropylidenediphenol (bisphenol-A), 1,3,5-trimethyl-2,4,6-tris(3,5-di(tert-butyl)-4-hydroxybenzyl)benzene (Ethanox® 330 antioxidant, Albemarle Corporation), 1,1,2,2-tetrakis(p-hydroxyphenyl) ethane, 1,1'-bi-2-naphthol, 1,3,5-tri(6-hydroxy-2-naphthyl)-benzene, 1-[2,6-bis(4-hydroxyphenyl)phenyl]phenol, 4'-n-butylamino-4-biphenylol, 2,2'-biphenyldi(methylamine), 2,4'-biphenyldi(methylamine), 1,1'-binaphthyl-2,2'-di(methylamine), 4,4'-di(isopropylamino)-terphenyl, p,p'-di(ethylamino)quaterphenyl, biphenyl-4,4'-dithiol, and the like. Preferred polyfunctional compounds include 4,4'-ethylenediphenol, 4,4'-methylenebis(2,6-di(tert-butyl)-phenol), and 1,3,5-trimethyl-2,4,6-tris(3,5-di(tert-butyl)-4-hydroxybenzyl)benzene.

Polyfunctional compounds suitable in the practice of this invention in which at least one of the aromatic groups is heteroaromatic include 2,6-bis(4-hydroxyphenyl)pyridine, 3,5-bis(4-hydroxy-benzyl)pyridine, 6,6'-dihydroxy-2,2'-dipyridyl, 6,6"-dihydroxy-2,2':6',2"-terpyridine, 2-ethylamino-5-(2-hydroxyphenyl)-1,3,4-oxadiazole, 2-thiol-5-(2-hydroxyphenyl)-1,3,4-oxadiazole, 5-(4-methylaminophenyl)-1,3,4-oxadiazole-2-thiol, 2-hydroxy-4-(4-hydroxyphenyl)-thiazole, 5,5'-dihydroxy-2,2'-bithiophene, and the like.

Normally, the support material is contacted with an organoaluminum compound so that at least a portion of the organoaluminum compound residue (or organoaluminum moiety) contains Al—R moieties, which can further react with the following polyfunctional compound.

By bringing the organoaluminum compound, support material, and polyfunctional compound into contact, the activator precursor compositions may be comprised of moieties formed from organoaluminum compounds, a support material, and moieties formed from polyfunctional compounds, which may be polyfunctional groups which have at least two aromatic groups in which at least two of said aromatic groups each has at least one polar moiety thereon.

The moieties formed from the polyfunctional compounds (polyfunctional groups) may have at least two aromatic rings in which at least two of the aromatic rings each has at least one polar moiety thereon. The aromatic groups can be homocyclic or heterocyclic, monocyclic or multicyclic. Generally, the polyfunctional group has twelve to about sixty carbon atoms, preferably about thirteen to about fifty-two carbon atoms, and more preferably about thirteen to about thirty carbon atoms. The polar moieties need not be sterically hindered, although alkyl groups can be present on the aromatic rings, including alkyl groups that sterically hinder the polar moieties. Another way of describing the polyfunctional group is as represented by the formula $E(ArJ-)_g$,
where E is an organic moiety, an atom, or a bond;
Ar is an aromatic moiety;
J is a polar atom or a polar group;
g is an integer equal to or greater than 2;
and each ArJ- can be same or different.

E, Ar, J, g, and the preferences for each are as described below for the polyfunctional compounds. Similar to the polyfunctional compound above, while the polar moiety (J) need not be sterically hindered, alkyl groups can be present in the aromatic groups, including alkyl groups that sterically hinder the polar moiety. E can be an atom-to-atom bond. For example, when the polyfunctional group is 4,4'-diphenoxy, E is the bond between the two aromatic rings.

Suitable polyfunctional groups or moieties in the practice of this invention include 2,2'-diphenoxy, 4,4'-diphenoxy, 3,4'-diphenoxy, 2,2'-methylenebis(phenoxy), 4,4'-methylenebis (phenoxy), 4,4'-ethylenediphenoxy, 2-(5-methylphen-2-oxy)-4-methylphenoxy, 6,6'-methylenebis(2-tert-butyl-4-methylphenoxy), 4,4'-methylenebis(2,6-di(tert-butyl) phenoxy), 6,6'-(1-ethylidene)bis(2,4-di(tert-butyl)phenoxy), 4,4'-methylenebis(2,6-di(tert-butyl)phenoxy), 4,4'-isopropylidenediphenoxy, 1,3,5-trimethyl -2,4,6-tris(3,5-di(tert-butyl)-4-oxybenzyl)benzene, 1,1,2,2-tetrakis(4-oxyphenyl) ethane, 1,1'-bi-2-naphthoxy, 1,3,5-tri(6-oxy-2-naphthyl) benzene, 4'-n-butylamino-4-biphenyloxy, 2,2'-biphenyldi (methylamino), 2,4'-biphenyldi(methylamino), 1,1'-binaphthyl-2,2'-di(methylamino), 4,4'-di(isopropylamino)-terphenyl, p,p'-di(ethylamino)quaterphenyl, biphenyl-4,4'-dithio, 2,6-bis(4-phenoxy)pyridine, 3,5-bis(4-benzyloxy) pyridine, 6,6'-dioxy-2,2'-dipyridyl, 6,6"-dioxy-2,2':6',2"-terpyridine, 5-(2-phenoxy)-1,3,4-oxadiazolyl-2-ethylamino, 5-(2-phenoxy)-1,3,4-oxadiazoyl-2-thio, 5-(4-methylaminophenyl)-1,3,4-oxadiazole-2-thio, 4-(4-oxyphenyl)-thiazolyl-2-oxy, 2,2'-bithiophenyl-5,5'-dioxy, and the like. Preferred polyfunctional groups include 4,4'-ethylenediphenoxy, 4,4'-methylenebis(2,6-di(tert-butyl) phenoxy), and 1,3,5-trimethyl-2,4,6-tris(3,5-di(tert-butyl) -4-benzyloxy)benzene.

The terms oxy, amino, or thio for the polyfunctional groups or polyfunctional moieties described above refers to the examples of J- in the formula $E(ArJ-)_g$ when J- is O—, N(R')—, or S— that forms through the reaction of the —OH, —N(R')H, or —SH groups on a polyfunctional compound with an Al—R moiety of the organoaluminum compound to form new O—Al, N(R')—Al, or S—Al bonds with the losses of the polar monoprotic group's proton as H—R. It should be understood that by reacting the polyfunctional compound with a support material treated with an organoaluminum compound, it is expected that at least one of the polar monoprotic groups on the majority of the polyfunctional compounds should react with at least one of the Al—R group on the organoaluminum-treated support to form a linkage of support-organoaluminum moiety-polyfunctional compound moiety via sigma bonding. It is not necessary that all of the polar monoprotic groups on the polyfunctional compound react with an Al—R moiety.

Activator Compositions

Activator compositions of the invention comprise an aluminoxane and an activator precursor composition comprised of i) a support material in contact with an organoaluminum compound, and ii) a polyfunctional compound which has at least two aromatic groups in which at least two of said aromatic groups each has at least one polar monoprotic group thereon. The support material, organoaluminum compound, and polyfunctional compound are as described above for the activator compositions. The aluminoxanes are as described below. It is to be understood that these components may not be in the same form as they were before they became part of the activator composition. Activator compositions of this invention can be produced by the processes described below.

Aluminoxanes

Aluminoxanes are a component of the activator compositions of the invention. Aluminoxanes are generally obtained by hydrolyzing aluminum compounds such as alkyl aluminum compounds with water e.g., by direct water addition, contact with a water-wet material such as a solvent containing water or a solid substrate such as a porous catalyst support wet with or soaked in water, or via salt hydrate addition; the resulting products, depending on the amount of added water, are dimeric or complex mixtures of oligomeric aluminoxanes. Another way to form aluminoxanes is by reaction of an alkyl aluminum compound with an organic compound with one or more oxygen-containing functional groups such as carbonyl, carboxyl, and/or hydroxyl groups; examples of such compounds include PhCOMe, PhCOOH, PhCOOMe, $Ph_3COH$ and the like. Aluminoxanes that can be used in the practice of this invention also include alkyl-aluminum derived aluminoxanes formed by either of the methods just described and further treated with one or more reagents such as a halogen-containing compound, for example trifluorotoluene-treated aluminoxanes, and dimethylaluminum fluoride-treated aluminoxanes as described in Publications WO 2007/131010 A2, WO 2007/005364 A2, and WO 2005/066191 A1.

Non-limiting examples of aluminoxanes that can be used in this invention include methylaluminoxane, ethylaluminoxane, n-propylaluminoxane, n-butylaluminoxane, isobutylaluminoxane, n-hexylaluminoxane, n-octylaluminoxane, decylaluminoxane, dodecylaluminoxane, tetradecylaluminoxane, hexadecylaluminoxane, octadecylaluminoxane, phenylaluminoxane, tolylaluminoxane, and the like. Mixtures of aluminoxanes may also be used.

Preferred aluminoxanes are those in which the hydrocarbyl groups are saturated, particularly those aluminoxanes in which the hydrocarbyl groups have from one to about twenty carbon atoms. More preferred are aluminoxanes in which the saturated hydrocarbyl groups have from one to about six carbon atoms. Even more preferred are methylaluminoxane, ethylaluminoxane, n-butylaluminoxane, and iso-butylaluminoxane. Highly preferred are methylaluminoxane and ethylaluminoxane. The most highly preferred aluminoxane is methylaluminoxane.

Most commercially-available aluminoxanes contain free or Lewis-base-extractable aluminum trialkyls. For example, a 30% toluene solution of methylaluminoxane from Albemarle Corporation usually contains about 15 mol % of tetrahydrofuran-extractable trimethylaluminum. Aluminoxanes with free, extractable trialkylaluminum compounds present therein are recommended and preferred. This amount of free, extractable trialkylaluminum compound should also be included in the amount of organoaluminum compound with f=3 for the calculation of molar ratios involving the organoaluminum compound.

By bringing the organoaluminum compound, support material, polyfunctional compound, and aluminoxane into contact, the activator compositions may be comprised of moieties formed from organoaluminum compounds, a support material, and moieties formed from polyfunctional compounds, which may be polyfunctional groups which have at least two aromatic groups in which at least two of said aromatic groups each has at least one polar moiety thereon. Polyfunctional groups and the preferences therefor are as described above.

A preferred activator composition comprises organoaluminum moieties formed from trimethylaluminum (which are expected to form dimethylaluminum moieties, partially or completely), silica, methylaluminoxane, and polyfunctional groups.

In the activator compositions, the aluminum from the aluminoxane becomes bound to, and part of, the activator composition, and is often indistinguishable from the aluminum already present from the organoaluminum compound. Thus, it is understood that organoaluminum moieties may not be distinguishable from the aluminoxane component of the activator composition.

Catalyst Compositions

The catalyst compositions of this invention are formed from interaction between an activator composition of the invention and at least one catalyst compound or complex of a transition metal, or at least one catalyst compound of a metal of the lanthanide or actinide series. The activator compositions are as described above, and the catalyst compounds and complexes are as just described. It is to be understood that the activator composition and the catalyst compound or complex are not in the same form as they were before they became part of the activator composition. Usually, the catalyst compound or complex contains labile groups that are removed by interaction with the activator composition. Catalyst compositions formed from metallocene-based catalyst compounds are preferred catalyst compositions.

As noted above, the support material also serves as a template to regulate the particle sizes of the activator precursor compositions and/or activator compositions. In turn, the particle sizes of the activator compositions affect the morphology of the catalyst compositions formed with the activator compositions of this invention.

Forming Activator Precursor Compositions

The formation of the activator precursor compositions and the activator compositions is generally facile, and any by-products of the formation present in the activator precursor composition or activator composition do not appear to adversely affect the properties of activator compositions made from the activator precursor compositions, or the catalyst compositions made from the activator compositions.

When preparing an activator precursor composition or an activator composition, the temperature can be ambient, and the reaction mixture can be heated if desired. Typical temperatures for heating the reaction mixture are in the range of about 20° C. to about 130° C., and preferably about 40° C. to about 70° C. Heating the reaction mixture so that it is under reflux conditions is also preferred.

As noted above, this invention relates to processes for forming activator precursor compositions. These processes comprise bringing together, in an inert, anhydrous environment, i) a support material in contact with an organoaluminum compound, and ii) a polyfunctional compound which has at least two aromatic groups in which at least two of said aromatic groups each has at least one polar monoprotic group thereon.

To form activator precursor compositions of this invention, the support material and the organoaluminum compound are contacted to form an organoaluminum-treated support, followed by adding the polyfunctional compound thereto.

The order in which the components are brought into contact has some influence on the structure of the activator precursor composition. At least in some instances, the order in which the components are brought together affects the morphology of catalysts ultimately formed from these activator precursor compositions and thereby affects reactor fouling during polymerization with the catalyst.

The activator precursor compositions formed by the above process are activator precursor compositions of this invention.

In the processes for forming activator precursor compositions, as a result of contact with the support material, the organoaluminum compound desirably has formed organoaluminum moieties which then interact with the polyfunctional compound through the polar monoprotic groups on the polyfunctional compound molecule. Typically this interaction occurs by elimination of a hydrocarbon formed through proton transfer from the polar monoprotic group of the polyfunctional compound to form $H_2$ when R is H or a C—H bond with the carbon atom (of a hydrocarbyl group) that is bound to the aluminum atom of the organoaluminum moiety, resulting in a chemical bond between the organoaluminum moiety and the polyfunctional compound.

Enough organoaluminum compound should be included so that a portion of the R groups (of the organoaluminum compound) can react with at least a portion of the polar monoprotic groups or other polar groups or sites, collectively, polar surface groups, present on the surface of the support material. A molar ratio of Al—R groups to polar surface groups is generally about 0.8:1 or more, preferably about 0.9:1 or more. Preferably, the molar ratio of R groups to polar surface groups is about 1:1 or more. Preferred molar ratios of R groups to polar surface groups are in the range of about 1.01:1 to about 3:1, more preferably in the range of about 1.1:1 to about 2:1 Thus, it is recommended that the amount of polar monoprotic groups on the support surface be quantified. Methods for such quantification of the polar monoprotic groups on the support surface include NMR titration with a trialkylaluminum compound or a Grignard reagent as described in Example 4.2-1 of WO 2008/036594.

Use of the moles of aromatic rings of the polyfunctional compound having polar monoprotic groups thereon rather than the moles polar monoprotic groups is recommended because in instances in which an aromatic ring of the polyfunctional compound has more than one polar monoprotic group, only one of the polar monoprotic groups is expected to react. It is recommended that the molar ratio of the R groups in the organoaluminum compound to moles of aromatic rings having polar monoprotic groups thereon of the polyfunctional compound are about 0.5:1 or more, preferably about 0.9:1 or more. More preferred is molar ratio of about 1:1 or more. A molar ratio of about 1:1 is expected to form a monomeric compound from the polyfunctional compound and the organoaluminum compound. Preferably, the molar ratio of R groups of the organoaluminum compound to aromatic rings having polar monoprotic groups of the polyfunctional compound is in the range of about 1.01:1 to about 3:1, more preferably in the range of about 1.1:1 to about 2:1.

Regarding the organoaluminum compound, the free, extractable trialkylaluminum compound present in the aluminoxane should also be included in the amount of organoaluminum compound with f=3 for the calculation of molar ratios involving the organoaluminum compound.

Overall, the molar ratio of R groups of the organoaluminum compound to the total amount of polar groups (which includes the aromatic rings having polar monoprotic groups from the polyfunctional compound and the polar surface groups of the support material) is about 0.8:1 or more, preferably about 0.9:1 or more, preferably 1:1 or more, more preferably in the range of about 1.01:1 to about 3:1, and still more preferably in the range of about 1.1:1 to about 2:1. The total molar amount of R groups of the organoaluminum compound to the polar groups may also be larger than 3:1, although this is less preferred. Although a slight excess of organoaluminum compound (i.e., Al:total polar group ratio>1:1) may be used, it sometimes disconnects the link between the support and the polyfunctional compound through the organoaluminum compound-derived bridge (—Al(R)- or —Al(Z)-bridge) and causes a poor finished catalyst morphology, and sometimes a solid material is difficult to obtain.

In the processes for forming activator precursor compositions, support material is typically included as about 5 wt % to about 70 wt % relative to the total weight of the organoaluminum compound(s) and polyfunctional compound(s) included in the process. Depending on the support pre-treatment conditions and the particular polyfunctional compound, the support material can range from about 5 wt % to about 70 wt % of the activator precursor composition. For support materials calcined at lower temperatures (100 to ~600° C.), the support is usually present in the activator precursor composition at about 5 wt % to about 40 wt % per mole of aromatic rings having a polar monoprotic group thereon of the polyfunctional compound. For support materials calcined at higher temperatures (~600 to 1000° C.), the support is usually present in the activator precursor composition at about 20 wt % to about 70 wt % per mole of aromatic rings having a polar monoprotic group thereon of the polyfunctional compound.

Considering the significantly different molecular weights of different polyfunctional compounds in use, the support can be about 1 to 80% of the total activator precursor weight, more preferably 5 to 60 wt %, and most preferably 10-50 wt %. The typical Al content is 1-30 wt % of the activator precursor total weight, more preferably 3-20 wt %, and most preferably 4-10 wt %. Therefore, the polyfunctional compound can be 1-70 wt %, preferably 4-40 wt %, and more preferably 8-25 wt %.

Regarding the relative amounts of organoaluminum compounds, R groups thereof, polyfunctional groups, the aromatic groups having the polar monoprotic groups thereon, the polar monoprotic groups on the aromatic rings of the polyfunctional compounds, and the support material, the same molar ratios apply to the compositions of the invention e.g., the moles of polar groups of the polyfunctional groups, again keeping in mind that the discussion may more properly refer to the components prior to their interaction to form the compositions (e.g., the R groups of the organoaluminum compound, at least a portion of which are expected to react, and will no longer be part of the organoaluminum compound).

Forming Activator Compositions

This invention further relates to processes for forming activator compositions. These processes comprise, in an inert, anhydrous environment, i) forming an organoaluminum-treated support by contacting a support material and an organoaluminum compound,
ii) contacting said organoaluminum-treated support with either
    a) a polyfunctional compound, forming a mixture, and then contacting said mixture with an aluminoxane, or
    b) an aluminoxane, forming a mixture, and then contacting said mixture with a polyfunctional compound, or
    c) a portion of a polyfunctional compound, forming a first mixture, contacting said first mixture with the aluminoxane, forming a second mixture, and
        contacting said second mixture with more polyfunctional compound,
    wherein said polyfunctional compound has at least two aromatic groups in which at least two of said aromatic groups each has at least one polar monoprotic group thereon,
such that an activator composition is formed.

In another embodiment, the process for forming an activator composition comprises, in an inert, anhydrous environment,
    i) forming an organoaluminum-treated support by contacting a support material and an organoaluminum compound, and
    ii) contacting said an organoaluminum-treated support sequentially with
        a) a polyfunctional compound followed by an aluminoxane, or
        b) an aluminoxane followed by a polyfunctional compound,
    wherein said polyfunctional compound has at least two aromatic groups in which at least two of said aromatic groups each has at least one polar monoprotic group thereon,
such that an activator composition is formed.

In some embodiments, the activator composition is made by combining an activator precursor composition with an aluminoxane. When the activator composition is made this way, the morphology of the activator composition is influenced by the particle size of the activator precursor composition. It is not necessary to isolate the activator precursor composition prior to bringing it together with the aluminoxane. When the activator composition is not made from an activator precursor composition, the particle size of the activator composition can be influenced by the particle size of the support material, or by varying the amount of the organoaluminum compound. In addition, the amount of aluminoxane affects the activity of a catalyst composition made from an activator composition; the activity of the catalyst composition decreases as the amount of aluminoxane in the activator composition decreases.

To form activator compositions of this invention, the components of the activator compositions can be combined in any of several orders. The aluminoxane can be added as the last component to any of the above sequences described above for forming activator precursor compositions. The free trialkylaluminum compound present in an aluminoxane can have an impact on both the morphology and productivity of a catalyst made from an activator composition of this invention. Therefore, a portion of organoaluminum compound can be added to the aluminoxane to increase the free trialkylaluminum content present therein, or the free trialkylaluminum content in the aluminoxane can be reduced by a physical method (e.g., vacuum removal) or chemical method (e.g., alcohol treatment).

In one suitable addition sequence, the support material and organoaluminum compound are combined (forming an organoaluminum-treated support), followed by combining the polyfunctional compound with the organoaluminum-treated support, and then combining the resultant mixture with the aluminoxane. In this sequence, the polyfunctional compound can be added to the organoaluminum-treated support, the organoaluminum-treated support can be added to the polyfunctional compound, or both can be concurrently fed to a reaction zone.

In another suitable addition sequence, the support material and organoaluminum compound are combined (forming an organoaluminum-treated support), followed by combining the aluminoxane with the organoaluminum-treated support, and then combining the resultant mixture with the polyfunctional compound. In this sequence, the polyfunctional compound can be added to the mixture formed from the organoaluminum-treated support and the aluminoxane, or the mixture formed from the organoaluminum-treated support and the aluminoxane can be added to the polyfunctional compound.

Without being bound by theory, the two addition sequences just described allow a significant amount of the polyfunctional compound moieties to bind to the support and at the same time bind to the aluminoxane, ensuring that the polyfunctional group-modified aluminoxane can either bind to the support or co-precipitate with the support to regulate the finished catalyst's particle size distribution, the resulting polyolefin resins' morphology, and to minimize or avoid fouling of the polymerization reactor.

Benefits are also from other addition sequences, such as forming an organoaluminum-treated support, combining this with a portion of the aluminoxane, then the polyfunctional compound, followed by another portion of aluminoxane; forming an organoaluminum-treated support, combining this with a portion of the polyfunctional compound, then the aluminoxane, followed by another portion of polyfunctional compound. The inert solvent can be included at any point during the process, but is preferably present initially.

The activator compositions formed by the above process are activator compositions of this invention.

In the processes for forming activator compositions, the aluminoxane can be brought into contact with the activator precursor and contribute mass about 5-80 wt %, preferably 10-60 wt %, and more preferably 15-50 wt %, to the total weight of the activator composition. Another way of viewing this is that each component of the activator precursor composition is now reduced accordingly due to the introduction of the aluminoxane. The support material is reduced to about 0.2 wt % to about 75 wt % of the total weight of the organoaluminum compound(s), polyfunctional compound(s), and aluminoxane(s) included in the process when the activator composition is not formed from an activator precursor composition and an aluminoxane. The total aluminum contributed from both the organoaluminum compound and the aluminoxane can be 7 wt % to 35 wt %, preferably 12 wt % to 30 wt %, and more preferably 15-25 wt %, depending on the aluminoxane amount in use. The polyfunctional compound is reduced to about 0.02 wt % to 65 wt % in the activator composition, preferably 0.8 wt % to 38 wt %, and more preferably 2-24 wt %, depending on the polar monoprotic group number g and the molecular weight of the polyfunctional compound.

In the activator compositions of this invention, the support material is usually about 1 wt % to about 30 wt % of the composition, the activator composition typically contains about 1 wt % to about 60 wt % aluminum, depending on the molecular weight of the polyfunctional compound and the amount of aluminoxane in use.

Regarding the amounts for the organoaluminum compounds, R groups thereof, polyfunctional groups, the aromatic groups having the polar monoprotic groups thereon, the polar monoprotic groups on the aromatic rings of the polyfunctional compounds, and the polar surface groups are the same as for the activator precursor compositions and processes. As above for the activator precursor compositions, the same molar ratios apply to the activator compositions of the invention e.g., the moles of polar groups of the polyfunctional groups, again keeping in mind that the discussion may more properly refer to the components prior to their interaction to form the activator compositions (e.g., the R groups of the organoaluminum compound, at least a portion of which are expected to react, and will no longer be part of the organoaluminum compound).

Processes and Components for Forming Catalyst Compositions

As mentioned above regarding formation and handling of the activator precursor compositions and the activator compositions, it is preferred that the catalyst components as well as the resultant catalyst compositions be handled in an inert, moisture-free, oxygen free environment such as argon, nitrogen or helium because of the sensitivity of the catalyst components and catalyst compositions to moisture and oxygen.

Catalyst compositions are formed by bringing together an activator composition of this invention and a catalyst compound or complex of a transition metal, lanthanide metal, or actinide metal, in an inert solvent. Normally, the activator composition and the catalyst compound or complex are combined in an inert solvent and stirred. Neither heating nor cooling of the reaction is required. Typically, the molar ratio of aluminum in the activator composition to transition metal is in the range of about 10:1 to about $10^5$:1, preferably about 10:1 to about 1000:1, more preferably about 50:1 to about 300:1.

The components used in forming catalyst compositions include an inert solvent, an activator composition of this invention, and a catalyst compound or complex of a transition metal, lanthanide metal, or actinide metal. The inert solvents are as described above for forming the activator precursor compositions and the activator compositions. The activator compositions are as described above. The catalyst compounds and complexes of a transition metal, lanthanide metal, or actinide metal are described as follows.

The activator compositions of this invention are so effective as cocatalysts that they can be used with any known transition metal catalyst compound in which the transition metal thereof is a Group 3 to 10 transition metal of the Periodic Table, as well as with any known catalyst compound of a metal of the lanthanide or actinide series. The Periodic Table referred to herein is that appearing on page 27 of the Feb. 4, 1985 issue of *Chemical & Engineering News*. Groups 3 to 10 of the Periodic Table were formerly known as Groups IIIB through VIIIB Suitable catalyst compounds can also be described as d- and f-block metal compounds. See, for example, the Periodic Table appearing on page 225 of Moeller, et al., *Chemistry*, Second Edition, Academic Press, copyright 1984. As regards the metal constituent, preferred are compounds of Fe, Co, Ni, Pd, and V. More preferred are compounds of the metals of Groups 4-6 (Groups IVB to VIB; Ti, Zr, Hf, V, Nb, Ta, Cr, Mo, and W), and most preferred are the Group 4 (Group IVB) metals, especially titanium, zirconium, or hafnium.

Thus the transition metal catalyst compounds used in this invention can be one or more of any Ziegler-Natta catalyst compound, any metallocene, any compound of constrained geometry, any late transition metal complex, or any other transition metal compound or complex reported in the literature or otherwise generally known in the art to be an effective catalyst compound when suitably activated, including mixtures of at least two different types of such transition metal compounds or complexes, such as for example a mixture of a metallocene and a Ziegler-Natta olefin polymerization catalyst compound.

Among the transition metal compounds of the metals of Groups 3, 4, 5, and 6 (Groups IIIB, IVB, VB, and VIB) which can be used as the transition metal component of the catalyst compositions of and used in this invention are the compounds of such metals as scandium, titanium, zirconium, hafnium, cerium, vanadium, niobium, tantalum, chromium, molybdenum, tungsten, thorium and uranium often referred to as Ziegler-Natta type olefin polymerization catalysts. Preferred compounds of this type can be represented by the formula $MX_n(OR)_m$, in which M represents the transition metal atom or a transition metal atom cation containing one or two oxygen atoms such as vanadyl, zirconyl, or uranyl, X represents a halogen atom, OR represents a hydrocarbyloxy group having up to about 18 carbon atoms, preferably up to about 8 carbon atoms, and more preferably alkyl of up to about 4 carbon atoms, such as an alkyl, cycloalkyl, cycloalkylalkyl, aryl, or aralkyl, group and n and m are positive integers except that either one of them (but not both) can be zero, and where n+m is the valence state of the transition metal. Illustrative of some of the transition metal compounds which can he used are, for example, titanium dibromide, titanium tribromide, titanium tetrabromide, titanium dichloride, titanium trichloride, titanium tetrachloride, titanium trifluoride, titanium tetrafluoride, titanium diiodide, titanium triiodide, titanium tetraiodide, zirconium dibromide, zirconium tribromide, zirconium tetrabromide, zirconium dichloride, zirconium trichloride, zirconium tetrachloride, zirconium tetrafluoride, zirconium tetraiodide, hafnium tetrafluoride, hafnium tetrachloride, hafnium tetrabromide, hafnium tetraiodide, hafnium trichloride, hafnium tribromide, hafnium triiodide, vanadium dichloride, vanadium trichloride, vanadium tetrachloride, vanadium tetrabromide, vanadium tribromide, vanadium dibromide, vanadium trifluoride, vanadium tetrafluoride, vanadium pentafluoride, vanadium diiodide, vanadium triiodide, vanadium tetraiodide, vanadyl chloride, vanadyl bromide, niobium pentabromide, niobium pentachloride, niobium pentafluoride, tantalum pentabromide, tantalum pentachloride, tantalum pentafluoride, chromous bromide, chromic bromide, chromous chloride, chromic chloride, chromous fluoride, chromic fluoride, molybdenum dibromide, molybdenum tribromide, molybdenum tetrabromide, molybdenum dichloride, molybdenum trichloride, molybdenum tetrachloride, molybdenum pentachloride, molybdenum hexafluoride, lanthanum trichloride, cerous fluoride, cerous chloride, cerous bromide, cerous iodide, ceric fluoride, uranium trichloride, uranium tetrachloride, uranium tribromide, uranium tetrabromide, thorium tetrachloride, thorium tetrabromide, and the like. Among the hydrocarbyloxides and mixed halide/hydrocarbyloxides of the transition metals are $Ti(OCH_3)_4$, $Ti(OCH_3)Cl_3$, $Ti(OCH_3)Br_3$, $Ti(OCH_3)_2I_2$, $Ti(OC_2H_5)_4$, $Ti(OC_2H_5)_3Cl$, $Ti(OC_2H_5)Cl_3$, $Ti(OC_2H_5)Br_3$, $Ti(OC_4H_9)Br_3$, $Ti(OC_2H_5)I_3$, $Ti(OC_3H_7)_2Cl_2$, $Ti(O\text{-iso-}C_3H_7)_3Cl$, $Ti(O\text{-iso-}C_3H_7)_2Cl_2$, $Ti(O\text{-iso-}C_3H_7)Cl_3$, $Ti(OC_4H_9)_3Cl$, $Ti(OC_4H_9)_2Cl_2$, $Ti(OC_4H_9)Cl_3$, $Ti(OC_6H_5)Cl_3$, $Ti(O\text{-p-}CH_3C_6H_4)Cl_3$, $Ti(OC_6H_{13})_2Cl_2$, $Ti(OC_6H_{13})Cl_3$, $Ti(O\text{-cyclo-}C_6H_{11})Cl_3$, $Ti(OC_8H_{17})_2Br_2$, $Ti(O\text{-2-EtHex})_4$, $Ti(OC_{12}H_{25})Cl_3$, $Ti(OC_{17}H_{18})_2Br_2$, $Zr(OC_2H_5)_4$, $Zr(OC_4H_9)_4$, $Zr(OC_5H_{11})_4$, $ZrCl(OC_2H_5)_3$, $ZrCl_2(OC_2H_5)_2$, $ZrCl_3(OC_2H_5)$, $ZrCl(OC_4H_9)_3$, $ZrCl_2(OC_4H_9)_2$, $ZrCl_3(OC_4H_9)$, $Hf(OC_4H_9)_4$, Hf(OC$_4$H$_9$)$_3$Cl, VO(OC$_2$H$_5$)$_3$, VOCl(OCH$_3$)$_2$, VOCl(OC$_2$H$_5$)$_2$, VOCl(OC$_3$H$_7$)$_2$, VOCl(O-iso-C$_3$H$_7$)$_2$, VOCl$_2$(OCH$_3$), VOCl$_2$(OC$_2$H$_5$), VOCl$_2$(OC$_3$H$_7$), VOCl$_2$(O-iso-C$_3$H$_7$), VOBr(OCH$_3$)$_2$, VOBr(OC$_2$H$_5$)$_2$, VOBr(O-iso-C$_4$H$_9$)$_2$, VOBr$_2$(OC$_3$H$_7$), VOBr$_2$(O-iso -C$_3$H$_7$), VOBr$_2$(OC$_4$H$_9$), VOBr$_2$(O-iso-C$_4$H$_9$), VOI(OCH$_3$)$_2$, VOI(OC$_2$H$_5$)$_2$, VOI$_2$(OCH$_3$), VOI$_2$(O-cyclo-C$_3$H$_5$), VOI$_2$(OC$_5$H$_{11}$), VOI$_2$(O-cyclo-C$_6$H$_{11}$), Cr(O-iso-C$_4$H$_9$)$_3$, Mo(OC$_2$H$_5$)$_3$, and the like. Carboxylic acid salts and various chelates of the transition metal can also be used but in general are less preferred. A few non-limiting examples of such salts and chelates include zirconyl acetate, uranyl butyrate, chromium acetate, chromium(III)oxy-2-ethylhexanoate, chromium(III)$_2$-ethylhexanoate, chromium(III) dichloroethylhexanoate, chromium(II)$_2$-ethylhexanoate, titanium(IV)$_2$-ethylhexanoate, bis(2,4-pentanedionate)titanium oxide, bis (2,4-pentanedionate)titanium dichloride, bis(2,4-pentanedionate)titanium dibutoxide, vanadyl acetylacetonate, chromium acetylacetonate, niobium acetylacetonate, zirconyl acetylacetonate, chromium octylacetoacetate, and the like. Also, transition metal alkyls such as tetramethyl titanium, methyl titanium trichloride, tetraethyl zirconium, tetraphenyl titanium, and the like can be used.

Preferred transition metal compounds of the well-known Ziegler-Natta catalyst compounds are those of the Group 4 (Group IVB) metals, including the alkoxides, halides, and mixed halide/alkoxide compounds. More preferred are TiCl$_4$, ZrCl$_4$, HfCl$_4$, and TiCl$_3$, with TiCl$_4$ being most preferred. Such more preferred compounds can be used in chelated form in order to facilitate solubility. Suitable chelated catalysts of this type are known and reported in the literature.

Metallocenes are another broad class of olefin polymerization catalyst compounds with which the activator compositions of this invention can be used in forming novel highly effective catalysts of this invention. As used herein, the term "metallocene" includes metal derivatives which contain at least one cyclopentadienyl moiety. Suitable metallocenes are well known in the art and include the metallocenes of Groups 3, 4, 5, 6 (Groups IIIB, IVB, VB, and VIB), lanthanide and actinide metals, for example, the metallocenes which are described in U.S. Pat. Nos. 2,864,843; 2,983,740; 4,665,046; 4,874,880; 4,892,851; 4,931,417; 4,952,713; 5,017,714; 5,026,798; 5,036,034; 5,064,802; 5,081,231; 5,145,819; 5,162,278; 5,245,019; 5,268,495; 5,276,208; 5,304,523; 5,324,800; 5,329,031; 5,329,033; 5,330,948; 5,347,025; 5,347,026; and 5,347,752, whose teachings with respect to such metallocenes are incorporated herein by reference.

Metallocene structures in this specification are to be interpreted broadly, and include structures containing 1, 2, 3 or 4 Cp or substituted Cp rings. Thus metallocenes suitable for use in this invention can be represented by Formula (I):

$$B_aCp_bMX_cY_d \qquad (I)$$

where Cp, independently in each occurrence, is a cyclopentadienyl-moiety-containing group which typically has in the range of 5 to about 24 carbon atoms; B is a bridging group or ansa group that links two Cp groups together or alternatively carries an alternate coordinating group such as alkylaminosilylalkyl, silylamido, alkoxy, siloxy, aminosilylalkyl, or analogous monodentate hetero atom electron donating groups; M is a d- or f-block metal atom; each X and each Y is, independently, a group that is bonded to the d- or f-block metal atom; a is 0 or 1; b is a whole integer from 1 to 3 (preferably 2); c is at least 2; d is 0 or 1. The sum of b, c, and d is sufficient to form a stable compound, and often is the coordination number of the d- or f-block metal atom.

Cp is, independently, a cyclopentadienyl, indenyl, fluorenyl or related group that can π-bond to the metal, or a hydrocarbyl-, halo-, halohydrocarbyl-, hydrocarbylmetalloid-, and/or halohydrocarbylmetalloid-substituted derivative thereof. Cp typically contains up to 75 non-hydrogen atoms. B, if present, is typically a silylene (—SiR$_2$—), benzo (C$_6$H$_4$<), substituted benzo, methylene (—CH$_2$—), substituted methylene, ethylene (—CH$_2$CH$_2$—), or substituted ethylene bridge. M is preferably a metal atom of Groups 4-6, and most preferably is a Group 4 (Group IVB) metal atom, especially hafnium, and most especially zirconium. X can be a divalent substituent such as an alkylidene group, a cyclometallated hydrocarbyl group, or any other divalent chelating ligand, two loci of which are singly bonded to M to form a cyclic moiety which includes M as a member. Each X, and if present Y, can be, independently in each occurrence, a halogen atom, a hydrocarbyl group (alkyl, cycloalkyl, alkenyl, cycloalkenyl, aryl, aralkyl, etc.), hydrocarbyloxy, (alkoxy, aryloxy, etc.) siloxy, amino or substituted amino, hydride, aryloxy, triflate, and similar univalent groups that form stable metallocenes. The sum of b, c, and d is a whole number, and is often from 3-5. When M is a Group 4 (Group IVB) metal or an actinide metal, and b is 2, the sum of c and d is 2, c being at least 1. When M is a Group 3 (Group IIIB) or lanthanide metal, and b is 2, c is 1 and d is zero. When M is a Group 5 (Group VB) metal, and b is 2, the sum of c and d is 3, c being at least 2.

Also useful in this invention are compounds analogous to those of Formula (I) where one or more of the Cp groups are replaced by cyclic unsaturated charged groups isoelectronic with Cp, such as borabenzene or substituted borabenzene, azaborole or substituted azaborole, and various other isoelectronic Cp analogs. See for example Krishnamurti, et al., U.S. Pat. Nos. 5,554,775 and 5,756,611.

In one preferred group of metallocenes, b is 2, i.e., there are two cyclopentadienyl-moiety containing groups in the molecule, and these two groups can be the same or they can be different from each other.

Another sub-group of useful metallocenes which can be used in the practice of this invention are metallocenes of the type described in WO 98/32776 published Jul. 30, 1998. These metallocenes are characterized in that one or more cyclopentadienyl groups in the metallocene are substituted by one or more polyatomic groups attached via a N, O, S, or P atom or by a carbon-to-carbon double bond. Examples of such substituents on the cyclopentadienyl ring include —OR, —SR, —NR$_2$, —CH=, —CR=, and —PR$_2$, where R can be the same or different and is a substituted or unsubstituted C$_1$-C$_{16}$ hydrocarbyl group, a tri-C$_1$-C$_8$ hydrocarbylsilyl group, a tri-C$_1$-C$_8$ hydrocarbyloxysilyl group, a mixed C$_1$-C$_8$ hydrocarbyl and C$_1$-C$_8$ hydrocarbyloxysilyl group, a tri-C$_1$-C$_8$ hydrocarbylgermyl group, a tri-C$_1$-C$_8$ hydrocarbyloxygermyl group, or a mixed C$_1$-C$_8$ hydrocarbyl and C$_1$-C$_8$ hydrocarbyloxygermyl group.

Examples of metallocenes to which this invention is applicable include such compounds as:
bis(cyclopentadienyl)zirconium dimethyl;
bis(cyclopentadienyl)zirconium dichloride;
bis(cyclopentadienyl)zirconium monomethylmonochloride;
bis(cyclopentadienyl)titanium dichloride;
bis(cyclopentadienyl)titanium difluoride;
cyclopentadienylzirconium tri-(2-ethylhexanoate);
bis(cyclopentadienyl)zirconium hydrogen chloride;
bis(cyclopentadienyl)hafnium dichloride;
racemic and meso dimethylsilanylene-bis(methylcyclopentadienyl)hafnium dichloride;
racemic dimethylsilanylene-bis(indenyl)hafnium dichloride;

racemic ethylene-bis(indenyl)zirconium dichloride;
($\eta^5$-indenyl)hafnium trichloride;
($\eta^5$-C$_5$Me$_5$)hafnium trichloride;
racemic dimethylsilanylene-bis(indenyl)thorium dichloride;
racemic dimethylsilanylene-bis(4,7-dimethyl-1-indenyl)zirconium dichloride;
racemic dimethyl-silanylene-bis(indenyl)uranium dichloride;
racemic dimethylsilanylene-bis(2,3,5-trimethyl-1-cyclopentadienyl)zirconium dichloride;
racemic dimethyl-silanylene(3-methylcyclopentadienyl) hafnium dichloride;
racemic dimethylsilanylene-bis(1-(2-methyl-4-ethyl)indenyl)zirconium dichloride;
racemic dimethylsilanylene-bis(2-methyl-4,5,6,7-tetrahydro-1-indenyl)zirconium dichloride;
bis(pentamethylcyclopentadienyl)thorium dichloride;
bis(pentamethylcyclopentadienyl)uranium dichloride;
(tert-butylamido)dimethyl(tetramethyl-$\eta^5$-cyclopentadienyl)silanetitanium dichloride;
(tert-butylamido)dimethyl(tetramethyl-$\eta^5$-cyclopentadienyl)silane chromium dichloride;
(tert-butylamido)dimethyl(-$\eta^5$-cyclopentadienyl)silanetitanium dichloride;
(tert-butylamido)dimethyl(tetramethyl-$\eta^5$-cyclopentadienyl)silanemethyltitanium bromide;
(tert-butylamido)(tetramethyl-$\eta^5$-cyclopentadienyl)-1,2-ethanediyluranium dichloride;
(tert-butylamido)(tetramethyl-$\eta^5$-cyclopentadienyl)-1,2-ethanediyltitanium dichloride;
(methylamido)(tetramethyl-$\eta^5$-cyclopentadienyl)-1,2-ethanediylcerium dichloride;
(methylamido)(tetramethyl-$\eta^5$-cyclopentadienyl)-1,2-ethanediyltitanium dichloride;
(ethylamido)(tetramethyl-$\eta^5$-cyclopentadienyl)methylenetitanium dichloride;
(tert-butylamido)dibenzyl(tetramethyl-$\eta^5$-cyclopentadienyl)-silanebenzylvanadium chloride;
(benzylamido)dimethyl(indenyl)silanetitanium dichloride;
(phenylphosphido)dimethyl(tetramethyl-$\eta^5$-cyclopentadienyl)silanebenzyltitanium chloride;
rac-dimethylsilylbis(2-methyl-1-indenyl)zirconium dimethyl;
rac-ethylenebis(1-indenyl)zirconium dimethyl;
bis(methylcyclopentadienyl)titanium dimethyl;
bis(methylcyclopentadienyl)zirconium dimethyl;
bis(n-butylcyclopentadienyl)zirconium dimethyl;
bis(dimethylcyclopentadienyl)zirconium dimethyl;
bis(diethylcyclopentadienyl)zirconium dimethyl;
bis(methyl-n-butylcyclopentadienyl)zirconium dimethyl;
bis(n-propylcyclopentadienyl)zirconium dimethyl;
bis(2-propylcyclopentadienyl)zirconium dimethyl;
bis(methylethylcyclopentadienyl)zirconium dimethyl;
bis(indenyl)zirconium dimethyl;
bis(methylindenyl)zirconium dimethyl;
dimethylsilylenebis(indenyl)zirconium dimethyl;
dimethylsilylenebis(2-methylindenyl)zirconium dimethyl;
dimethylsilylenebis(2-ethylindenyl)zirconium dimethyl;
dimethylsilylenebis(2-methyl-4-phenylindenyl)zirconium dimethyl;
1,2-ethylenebis(indenyl)zirconium dimethyl;
1,2-ethylenebis(methylindenyl)zirconium dimethyl;
2,2-propylidenebis(cyclopentadienyl)(fluorenyl)zirconium dimethyl;
dimethylsilylenebis(6-phenylindenyl)zirconium dimethyl;
bis(methylindenyl)zirconium benzyl methyl;
ethylenebis[2-(tert-butyldimethylsiloxy)-1-indenyl]zirconium dimethyl;
dimethylsilylenebis(indenyl)chlorozirconium methyl;
5-(cyclopentadienyl)-5-(9-fluorenyl)1-hexene zirconium dimethyl;
dimethylsilylenebis(2-methylindenyl)hafnium dimethyl;
dimethylsilylenebis(2-ethylindenyl)hafnium dimethyl;
dimethylsilylenebis(2-methyl-4-phenylindenyl)hafnium dimethyl;
2,2-propylidenebis(cyclopentadienyl)(fluorenyl)hafnium dimethyl;
bis(9-fluorenyl)(methyl)(vinyl)silane zirconium dimethyl,
bis(9-fluorenyl)(methyl)(prop-2-enyl)silane zirconium dimethyl,
bis(9-fluorenyl)(methyl)(but-3-enyl)silane zirconium dimethyl,
bis(9-fluorenyl)(methyl)(hex-5-enyl)silane zirconium dimethyl,
bis(9-fluorenyl)(methyl)(oct-7-enyl)silane zirconium dimethyl,
(cyclopentadienyl)(1-allylindenyl) zirconium dimethyl,
bis(1-allylindenyl)zirconium dimethyl,
(9-(prop-2-enyl)fluorenyl)(cyclopentadienyl)zirconium dimethyl,
(9-(prop-2-enyl)fluorenyl)(pentamethylcyclopentadienyl) zirconium dimethyl,
bis(9-(prop-2-enyl)fluorenyl)zirconium dimethyl,
(9-(cyclopent-2-enyl)fluorenyl)(cyclopentadienyl)zirconium dimethyl,
bis(9-(cyclopent-2-enyl)(fluorenyl)zirconium dimethyl,
5-(2-methylcyclopentadienyl)-5(9-fluorenyl)-1-hexene zirconium dimethyl,
1-(9-fluorenyl)-1-(cyclopentadienyl)-1-(but-3-enyl)-1-(methyl)methane zirconium dimethyl,
5-(fluorenyl)-5-(cyclopentadienyl)-1-hexene hafnium dimethyl,
(9-fluorenyl)(1-allylindenyl)dimethylsilane zirconium dimethyl,
1-(2,7-di(alpha-methylvinyl)(9-fluorenyl)-1-(cyclopentadienyl)-1,1-dimethylmethane zirconium dimethyl,
1-(2,7-di(cyclohex-1-enyl)(9-fluorenyl))-1-(cyclopentadienyl)-1,1-methane zirconium dimethyl,
5-(cyclopentadienyl)-5-(9-fluorenyl)-1-hexene titanium dimethyl,
5-(cyclopentadienyl)-5-(9-fluorenyl)1-hexene titanium dimethyl,
bis(9-fluorenyl)(methyl)(vinyl)silane titanium dimethyl,
bis(9-fluorenyl)(methyl)(prop-2-enyl)silane titanium dimethyl,
bis(9-fluorenyl)(methyl)(but-3-enyl)silane titanium dimethyl,
bis(9-fluorenyl)(methyl)(hex-5-enyl)silane titanium dimethyl,
bis(9-fluorenyl)(methyl)(oct-7-enyl)silane titanium dimethyl,
(cyclopentadienyl)(1-allylindenyl) titanium dimethyl,
bis(1-allylindenyl)titanium dimethyl,
(9-(prop-2-enyl)fluorenyl)(cyclopentadienyl)hafnium dimethyl,
(9-(prop-2-enyl)fluorenyl)(pentamethylcyclopentadienyl) hafnium dimethyl,
bis(9-(prop-2-enyl)fluorenyl)hafnium dimethyl,
(9-(cyclopent-2-enyl)fluorenyl)(cyclopentadienyl) hafnium dimethyl,
bis(9-(cyclopent-2-enyl)(fluorenyl)hafnium dimethyl,
5-(2-methylcyclopentadienyl)-5(9-fluorenyl)-1-hexene hafnium dimethyl, 5-(fluorenyl)-5-(cyclopentadienyl)-1-octene hafnium dimethyl;
(9-fluorenyl)(1-allylindenyl)dimethylsilane hafnium dimethyl.
(tert-butylamido)dimethyl(tetramethylcyclopentadienyl)silane titanium(1,3-pentadiene);
(cyclopentadienyl)(9-fluorenyl)diphenylmethane zirconium dimethyl;
(cyclopentadienyl)(9-fluorenyl)diphenylmethane hafnium dimethyl;
dimethylsilanylene-bis(indenyl) thorium dimethyl;
dimethylsilanylene-bis(4,7-dimethyl-1-indenyl)zirconium dimethyl;
dimethylsilanylene-bis(indenyl)uranium dimethyl;
dimethylsilanylene-bis(2-methyl-4-ethyl-1-indenyl)zirconium dimethyl;
dimethylsilanylene-bis(2-methyl-4,5,6,7-tetrahydro-1-indenyl)zirconium dimethyl;
(tert-butylamido)dimethyl(tetramethyl-$\eta^5$-cyclopentadienyl)silane titanium dimethyl;
(tert-butylamido)dimethyl(tetramethyl-$\eta^5$-cyclopentadienyl)silane chromium dimethyl;
(tert-butylamido)dimethyl(tetramethyl-$\eta^5$-cyclopentadienyl)silane titanium dimethyl;
(phenylphosphido)dimethyl(tetramethyl-$\eta^5$-cyclopentadienyl)silane titanium dimethyl; and
[dimethylsilanediylbis(indenyl)]scandium methyl.

In many cases the metallocenes such as referred to above will exist as racemic mixtures, but pure enantiomeric forms or mixtures enriched in a given enantiomeric form can be used.

Other organometallic catalytic compounds with which the activator compositions of this invention can be used in forming novel catalysts of this invention are the late transition metal catalyst described, for example, in U.S. Pat. Nos. 5,516,739 to Barborak, et al.; 5,561,216 to Barborak, et al.; 5,866,663 to Brookhart, et al; 5,880,241 to Brookhart, et al; and 6,114,483 to Coughlin, et al. Such catalysts are sometimes referred to herein collectively as "a Brookhart-type late transition metal catalyst compound or complex".

Other transition metal catalyst compounds and catalyst complexes that can be used in the practice of this invention include catfluoro nickel, palladium, iron, and cobalt complexes containing diimine and bisoxazoline ligands such as described in Johnson et al. WO 96/23010; palladium and nickel catalysts containing selected bidentate phosphorus-containing ligands such as described in EP 381,495; catfluoro α-diimine-based nickel and palladium complexes such as described by Johnson et al. in *J. Am. Chem. Soc.*, 1995, 117, 6414, see also Brown et al. WO 97/17380; nickel complexes such as described by Johnson et al. in U.S. Pat. No. 5,714,556; cobalt(III) cyclopentadienyl catalytic systems such as described by Schmidt et al. in *J. Am. Chem. Soc.*, 1985, 107, 1443, and by Brookhart et al. in *Macromolecules*, 1995, 28, 5378; anfluoro phosphorus, oxygen donors ligated to nickel (II) such as described by Klabunde in U.S. Pat. Nos. 4,716,205, 4,906,754, 5,030,606, and 5,175,326; Group 8-10 (Group VIIIB) transition metal complexes coordinated with a bidentate ligand such as described in WO 98/40374; transition metal complexes with bidentate ligands containing pyridine or quinoline moieties such as described in U.S. Pat. No. 5,637,660; quinolinoxy or pyridinoxy-substituted Group 4 (Group IVB) transition metal trihalides such as described in U.S. Pat. No. 6,020,493; nickel complexes such as described by bis(ylide)nickel complexes such as described by Starzewski et al. in *Angew. Chem. Int. Ed. Engl.*, 1987, 26, 63, and U.S. Pat. No. 4,691,036; neutral N, O, P, or S donor ligands in combination with a nickel(0) compound and an acid such as described in WO 97/02298; aminobis(imino)phosphorane nickel catalysts such as described by Fink et al. in U.S. Pat. No. 4,724,273.

Illustrative, non-limiting additional examples of various types of transition metal compounds that can be employed include the following:
2,6-bis-[1-(1-methylphenylimino)ethyl]pyridine iron[II] chloride;
2,6-bis[1-(1-ethylphenylimino)ethyl]pyridine iron[II]chloride;
2,6-bis[1-(1-isopropylphenylimino)ethyl]pyridine iron[II] chloride;
2,6-bis-(1-(2-methylphenylimino)ethyl)pyridine iron(II) chloride;
N,N'-di(trimethylsilyl)benzamidinato copper(II);
tridentate Schiff base complexes of cobalt and iron described by Mashima in Shokubai 1999, vol. 41, p. 58;
nickel compounds of the type described in U.S. Pat. No. 5,880,323;
nickel(II) acetylacetonate;
bis(acetonitrile)dichloro palladium(II);
bis(acetonitrile)bis(tetrafluoroborate)palladium(II);
(2,2'-bipyridine)dichloro palladium(II);
bis(cyclooctadienyl)nickel(0);
palladium(II) acetylacetonate;
bis(salicylaldiminato) complexes of the type described by Matsui et. al. in *Chemistry Letters* 2000, pp. 554-555;
cobalt dioctoate;
cobaltocene;
(cyclopentadienyl)(triphenylphosphino)cobalt(II)diiodide; and
nickel compounds of the type described in JP 09-272709.

Preferred transition metal compounds which can be used in forming the catalyst compositions of this invention are transition metal compounds which can be represented by the formula:

$$MX_nY_m$$

where M is a transition metal of Group 4 to 8 (Group IVB to VIIIB) including the lanthanide series and actinide series, and preferably of Group 4 to 6 (Group IVB to VIB), of the Periodic Table, and Y is, independently, a halide or pseudohalide, n is the valence of M, and m is an integer of from 0 to n−1. Of the pseudohalides, preferred are alkoxide or oxyhalide groups. Pseudohalides, which is a term of art, refers to anfluoro moieties which as salt-like anions which are non-halogenides. Non-limiting examples of suitable pseudohalide groups are oxyhalide groups, hydrocarbyloxy groups (—OR groups such as alkoxy, aryloxy, cycloalkoxy, arylalkoxy, etc.), amido groups (—NR$_2$), hydrocarbylthio groups (—SR groups), and the like. Most preferred are compounds of the above formula wherein M is a Group 4 (Group IVB) metal. Non-limiting examples of suitable transition metal compounds include, for example, transition metal halides and oxyhalides such as titanium dibromide, titanium tribromide, titanium tetrabromide, titanium dichloride, titanium trichloride, titanium tetrachloride, titanium trifluoride, titanium tetrafluoride, titanium diiodide, titanium tetraiodide, zirconium dibromide, zirconium tribromide, zirconium tetrabromide, zirconium dichloride, zirconium trichloride, zirconium tetrachloride, zirconium tetrafluoride, zirconium tetraiodide, hafnium tetrafluoride, hafnium tetrachloride, hafnium tetrabromide, hafnium tetraiodide, hafnium trichloride, hafnium tribromide, hafnium triiodide, hafnium oxychloride, vanadium dichloride, vanadium trichloride, vanadium tetrachloride, vanadium trifluoride, vanadium tetrafluoride, vanadium pentafluoride, vanadium triiodide, vanadium oxytrichloride, vanadium oxytribromide, niobium pentabromide, niobium pentachloride, niobium pentafluoride, tantalum pentabromide, tantalum pentachloride, tantalum pentafluoride, chromous bromide, chromic bromide, chromous chloride, chromic chloride, chromous fluoride, chromic fluoride, molybdenum dibromide, molybdenum tribromide, molybdenum tetrabromide, molybdenum dichloride, molybdenum trichloride, molybdenum tetrachloride, molybdenum pentachloride, molybdenum hexafluoride, lanthanum trichloride, cerous fluoride, cerous chloride, cerous bromide, cerous iodide, ceric fluoride, uranium trichloride, uranium tetrachloride, uranium tribromide, uranium tetrabromide, thorium tetrachloride, thorium tetrabromide, and the like. Among suitable alkoxides and mixed halide/alkoxides of the transition metals are $Ti(OCH_3)_4$, $Ti(OC_2H_5)_4$, $Ti(OC_2H_5)_3Cl$, $Ti(OC_2H_5)Cl_3$, $Ti(O\text{-iso-}C_3H_7)Cl_3$, $Ti(OC_4H_9)_3Cl$, $Ti(OC_3H_7)_2Cl_2$, $Ti(O\text{-iso-}C_3H_7)_2Cl_2$, $Ti(OC_{17}H_{18})_2Br_2$, $Zr(OC_2H_5)_4$, $Zr(OC_4H_9)_4$, $Zr(OC_5H_{11})_4$, $ZrCl_3(OC_2H_5)$, $ZrCl(OC_4H_9)_3$, $Hf(OC_4H_9)_4$, $Hf(OC_4H_9)_3Cl$, $VO(OC_2H_5)_3$, $Cr(O\text{-iso-}C_4H_9)_3$, $Mo(OC_2H_5)_3$, and the like. Other transition metal compounds which may be used include amides such as $Ti(NMe_2)_4$, $Zr(NMe_2)_4$, $Ti(NEt_2)_4$, $Zr(NEt_2)_4$, and $Ti(NBu_2)_4$; carboxylic acid salts such as titanium oxalate, cobalt acetate, chromium acetate, nickel formate, thallium oxalate, and uranyl formate. Among the more preferred transition metal compounds are the halides, oxyhalides, alkoxides, and mixed halide-alkoxides of the Group 4 to 6 (Group IVB to VIB) metals, and more particularly of the metals of Groups 4 and 5 (Group IVB and VB). Among especially preferred transition metal compounds are the trivalent or tetravalent Group 4 (Group IVB) metal halides, particularly the chlorides, and the vanadium oxyhalides, particularly vanadium oxytrichloride.

Polymerization and Polymers of this Invention

The catalyst compositions of this invention are useful in producing olefin polymers and especially ethylene polymers, propylene polymers, ethylene/α-olefin copolymers, styrene polymers and copolymers and the like. In conducting the polymerizations pursuant to this invention, the catalyst components can be in solution or in solid form. When the catalyst composition is in a solution, the solvent can be, where applicable, a large excess quantity of the liquid olefinic monomer. Typically, however, an ancillary inert solvent, typically a liquid paraffinic or aromatic hydrocarbon solvent is used, such as heptane, isooctane, decane, toluene, xylene, ethylbenzene, mesitylene, or mixtures of liquid paraffinic hydrocarbons and/or liquid aromatic hydrocarbons.

Polymers can be produced pursuant to this invention by homopolymerization of olefins, typically 1-olefins (also known as α-olefins) such as ethylene, propylene, 1-butene, styrene, or copolymerization of two or more copolymerizable monomers, at least one of which is typically a 1-olefin. The other monomer(s) used in forming such copolymers can be one or more different 1-olefins and/or a diolefin, and/or an acetylenic monomer. Olefins that can be polymerized in the presence of the catalyst compositions of this invention include α-olefins having 2 to 20 carbon atoms such as ethylene, propylene, 1-butene, 1-hexene, 4-methyl-1-pentene, 1-octene, 1-decene, 1-dodecene, 1-tetradecene, 1-hexadecene, and 1-octadecene. Normally, the hydrocarbon monomers used, such as 1-olefins, diolefins and/or acetylene monomers, will contain up to about 10 carbon atoms per molecule. Preferred 1-olefin monomers for use in the process include ethylene, propylene, 1-butene, 3-methyl-1-butene, 4-methyl-1-pentene, 1-hexene, and 1-octene. It is particularly preferred to use the catalyst compositions of this invention in the polymerization of ethylene, or propylene, or ethylene and at least one $C_3$-$C_8$ 1-olefin copolymerizable with ethylene. Typical diolefin monomers which can be used to form terpolymers with ethylene and propylene include butadiene, hexadiene, norbornadiene, and similar copolymerizable diene hydrocarbons. 1-Heptyne and 1-octyne are illustrative of suitable acetylenic monomers which can be used.

Often the monomer used is a 1-alkene monomer whereby a homopolymer is prepared. In other frequent cases a mixture of a 1-alkene monomer such as ethylene and at least one monomer copolymerizable therewith is used whereby a copolymer is produced.

Polymerization of ethylene or copolymerization with ethylene and an α-olefin having 3 to 10 carbon atoms may be performed in either the gas or liquid phase (e.g., in a solvent, such as toluene, or heptane). The polymerization can be conducted at conventional temperatures (e.g., 0° to 120° C.) and pressures (e.g., ambient to 50 kg/cm²) using conventional procedures as to molecular weight regulations and the like.

The heterogeneous catalysts of this invention can be used in polymerizations conducted as slurry processes or as gas phase processes. By "slurry" in this connection is meant that the particulate catalyst is used as a slurry or dispersion in a suitable liquid reaction medium which may be composed of one or more ancillary solvents (e.g., liquid aliphatic or aromatic hydrocarbons, etc.) or an excess amount of liquid monomer to be polymerized in bulk. Generally speaking, these polymerizations are conducted at one or more temperatures in the range of about 0 to about 160° C. and under atmospheric, subatmospheric, or superatmospheric conditions. Preferably polymerizations conducted in a liquid reaction medium containing a slurry or dispersion of a catalyst of this invention are conducted at temperatures in the range of about 40 to about 110° C. Typical liquid diluents for such processes include isobutane, pentane, isopentane, hexane, heptane, toluene, and like materials. Typically, when conducting gas phase polymerizations, superatmospheric pressures are used, and the reactions are conducted at temperatures in the range of about 50 to about 160° C. These gas phase polymerizations can be performed in a stirred or fluidized bed of catalyst in a pressure vessel adapted to permit the separation of product particles from unreacted gases. Thermostated ethylene, comonomer, hydrogen and an inert diluent gas such as nitrogen can be introduced or recirculated to maintain the particles at the desired polymerization reaction temperature. An aluminum alkyl such as triethylaluminum may be added as a scavenger of water, oxygen and other impurities. In such cases the aluminum alkyl is preferably employed as a solution in a suitable dry liquid hydrocarbon solvent such as toluene or xylene. Concentrations of such solutions in the range of about $5 \times 10^{-5}$ molar are conveniently used. But solutions of greater or lesser concentrations can be used, if desired. Polymer product can be withdrawn continuously or semi-continuously at a rate that maintains a constant product inventory in the reactor.

In general, the polymerizations and copolymerizations conducted pursuant to this invention are carried out using a catalytically effective amount of a novel catalyst composition of this invention, which amount may be varied depending upon such factors such as the type of polymerization being conducted, the polymerization conditions being used, and the type of reaction equipment in which the polymerization is being conducted. In many cases, the amount of the catalyst of this invention used will be such as to provide in the range of about 0.000001 to about 0.01 percent by weight of transition, lanthanide, or actinide metal based on the weight of the monomer(s) being polymerized.

The morphology of the catalyst compositions formed with the activator compositions of this invention affects the morphology of the polymers produced with these catalysts. It has been found that a catalyst with a narrower particle size range results in noticeably less reactor fouling, which in turn minimizes reactor shutdowns for cleaning and maintenance. In the Examples below, the resin morphologies are indicated by the degree of fouling of the polymerization reactor.

After polymerization and deactivation of the catalyst in a conventional manner, the product polymer can be recovered from the polymerization reactor by any suitable means. When conducting the process with a slurry or dispersion of the catalyst in a liquid medium the product typically is recovered by a physical separation technique (e.g., decantation, etc.). The recovered polymer is usually washed with one or more suitably volatile solvents to remove residual polymerization solvent or other impurities, and then dried, typically under reduced pressure with or without addition of heat. When conducting the process as a gas phase polymerization, the product after removal from the gas phase reactor is typically freed of residual monomer by means of a nitrogen purge, and may possibly be used without further catalyst deactivation or catalyst removal.

When preparing polymers pursuant to this invention, conditions may be used for preparing unimodal or multimodal polymer types. For example, mixtures of catalysts of this invention formed from two or more different metallocenes having different propagation and termination rate constants for ethylene polymerizations can be used in preparing polymers having broad molecular weight distributions of the multimodal type. As alluded to above, the catalyst morphology affects the morphology of the polymers produced, as evidenced by the degree of reactor fouling.

Polymers produced by this invention are formed into articles of manufacture.

The foregoing operations described herein are conducted under conventional inert atmospheres using suitably anhydrous materials.

The following examples are presented for purposes of illustration, and are not intended to impose limitations on the scope of this invention.

EXAMPLES

All experiments of these Examples were carried out under inert atmosphere conditions, using Schlenk glassware and vacuum line, in conjunction with a nitrogen drybox. Solvents were passed through commercial columns packed with selective adsorbent materials such as H-156 (an activated alumina), Selexsorb® COS, Selexsorb® CD (products of BASF Catalyst), 3 or 4 Å molecular sieves, Cu on alumina, and so forth, to remove moisture, oxygen, and polar impurities. Aluminoxanes were obtained from stock solutions manufactured by Albemarle Corporation. Elemental analyses were determined by ICP. Particle size distributions were determined by a particle size analyzer using laser light reflection.

Example 1

Activator Preparation

In a drybox with a $N_2$ atmosphere, silica gel (0.50 g, calcined at 200° C. for 4 hr., W.R. Grace 952; average particle size 35 μm) was slurried in toluene (2 g) containing trimethylaluminum (TMA, 0.12 g, product of Albemarle Corporation). The mixture was stirred at ambient temperature for 30 minutes. To this mixture was added methylaluminoxane (MAO, 4.58 g, 30% solution in toluene, product of Albemarle Corporation); this mixture was allowed to stir at ambient temperature for 10 minutes, after which 1,3,5-trimethyl-2,4,6-tris(3,5-di(tert-butyl)-4-hydroxybenzyl)benzene (1.0 g, Ethanox® 330 antioxidant, Albemarle Corporation) was added to the mixture while stirring. When the addition of Ethanox® 330 antioxidant was complete, the mixture was heated to 70° C. in an oil bath for 2 hours. After cooling the mixture to ambient temperature, the mixture was filtered and washed twice with 5 g of toluene.

Catalyst Preparation

The wet solid was then re-slurried in 5 g toluene, and rac-1,2-bis[indenyl]-ethylene-zirconium dichloride (45 mg) was added and the mixture was stirred at ambient temperature for 4 hours. The mixture was then filtered. The solid on the filter was washed twice with toluene (5 g) and once with isohexane (5 g), and dried under vacuum for 1 hour. A light orange solid powder (2.01 g) was obtained. Elemental analysis of the orange powder: Al 27.1%; Zr 0.396%. The particle size distribution of the catalyst was 3 to 120 μm.

Example 2

Activator Preparation

The materials were the same as those in Example 1, except that the silica gel had an average particle size of 20 μm (Fuji P-10). A slightly different addition sequence was employed: the silica gel was slurried in toluene containing trimethylaluminum, but the Ethanox® 330 antioxidant was added next, followed by the MAO. The mixture with all four components was heated to 70° C. in an oil bath for 2 hours, cooled to ambient temperature, and filtered and washed twice with 5 g of toluene.

Catalyst Preparation

Catalyst preparation was carried out as described in Example 1. The orange powder obtained had an elemental analysis of: Al 25%; Zr 0.41%. The particle size distribution of the catalyst was 6 to 70 μm.

Example 3

Activator Preparation

In the drybox with a $N_2$ atmosphere, silica gel (15 g, calcined at 140° C. for 2 hrs, P-10, Fuji Silysia Chemical Ltd.) was slurried in isohexane (97 g). Under agitation, neat trimethylaluminum (TMA, 2.206 g, product of Albemarle Corporation) was slowly added to the silica gel. The mixture was stirred at ambient temperature for 30 minutes. To this mixture was added 1,3,5-trimethyl-2,4,6-tris(3,5-di-tert-butyl-4-hydroxybenzyl)benzene (Ethanox® 330 antioxidant, 39.140 g, 20% solution in toluene, product of Albemarle Corporation). This mixture was allowed to stir at ambient temperature for 1 hour, after which methylaluminoxane (MAO, 38.431 g, 30% solution in toluene, product of Albemarle Corporation) was added to the mixture while stirring. When the addition of MAO was complete, the mixture was heated to 120° C. in an autoclave for 4 hours, and then this activator slurry was cooled to ambient temperature.

Catalyst Preparation

The above activator slurry (24.770 g, 15.21%) was mixed with rac-ethylene bis(tetrahydroindenyl) zirconium dichloride (75 mg) and the mixture was stirred at ambient temperature for 2 hours. The pale yellow solid was then filtered. The solid on the filter was washed twice with toluene (10 g) and once with isohexane (10 g), and dried under vacuum for 1 hour. A pale yellow solid powder (3.85 g) was obtained and had an elemental analysis by ICP of: Al 17.6%; Zr 0.36%. The particle size distribution of the catalyst was 6 to 70 μm.

Example 4 (Comparative)

Activator Preparation

No polyfunctional compound was used. The only organoaluminum compound was the small amount of trimethylaluminum that is incidentally present in methylaluminoxane. In a drybox with a $N_2$ atmosphere, silica gel (5 g, calcined at 200° C. for 4 hr, W.R. Grace 952; average particle size 35 μm) and toluene (25 g) were charged into a 300-mL three-neck round-bottom flask equipped with a mechanical stirrer and a thermocouple, forming a slurry. To this slurry MAO (10.22 g, 30% solution in toluene, Al =13.6%, product of Albemarle Corporation) was slowly added. After the MAO addition, the mixture was allowed to stir at ambient temperature for 30 minutes, following by heating at 70° C. in an oil bath for 2 hr. The mixture was then filtered and washed twice with toluene (25 g), forming a wet cake.

Catalyst Preparation

Toluene (25 g) was added to the wet cake solid to form a slurry. While the agitator was turned on, to the slurry then was added rac-1,2-bis[indenyl]-ethylene-zirconium dichloride (0.150 g). The mixture was allowed to stir at ambient temperature for 4 hr. The resultant solid was isolated by filtration and washed twice with toluene (10 g each) and once with isohexane (10 g), and dried under vacuum for 2 hours. The resultant solid underwent elemental analysis: Al=16.9%; Zr=0.41%. Without the polyfunctional compound, the silica could only support around 17 wt % MAO. The particle size distribution of the catalyst was 6 to 60 μm.

Example 5 (Comparative)

Activator Preparation

No support material was used. The only organoaluminum compound was the small amount of trimethylaluminum that is incidentally present in methylaluminoxane. In a drybox, to a solution of MAO in toluene (50 g, 10%, Al=4.55%; 84 mmol Al; Albemarle) was charged to an 8 oz. bottle along with a stirbar. While agitating the solution in the bottle, Ethanox® 330 antioxidant (6.25 g, 8 mmol; Albemarle) was slowly added to the MAO solution at ambient temperature. Isohexane (50 g) was then added to the bottle and the mixture was allowed to stir at ambient temperature for 1 hour. A white slurry formed and was stirred overnight. The white slurry was filtered, washed with three times with isohexane (10 g each), and dried under vacuum. The yield was 13 g of solid, which was a chunky, glassy material.

Catalyst Preparation

Some of the chunky, glassy solid activator material formed above (5 g) and toluene (20 g) were charged to a 4 oz. bottle. To the solid activator material was added rac-1,2-bis[indenyl]-ethylene-zirconium dichloride solid (0.10 g) slurried in isohexane (20 g). The mixture was shaken for 2 hours, and then filtered, washed with three times with isohexane (10 g each), and dried under vacuum to form a yellow solid (5 g). The yellow solid had an elemental analysis of: Al 23.3%; Zr 0.43%. The particle size distribution of the catalyst was 0.3 to 2000 μm.

Example 6 (Comparative)

Activator Preparation

The support material was not contacted first with an organoaluminum compound. In this Example, the aluminoxane and polyfunctional compound were added simultaneously. In the drybox in a $N_2$ atmosphere, silica gel (5 g, calcined at 140° C. for 2 hrs, P-10, Fuji Silysia Chemical Ltd.) was slurried in 100 mL toluene in a flask. To the slurry, MAO (2.561 g, 30%) which was pre-dissolved in 40 mL toluene was slowly added. To an addition funnel, MAO (10.249 g, 30%) and 100 mL toluene were added. To another funnel, Ethanox® 330 antioxidant (13.046 g, 20% solution) and 100 mL toluene were added. Both solutions started their additions to the flask containing the MAO/silica slurry at the same time, and the addition speed was adjusted so that both solutions were introduced at a similar pace. The addition was finished in 50 minutes. The mixture was stirred for 1 h at ambient temperature. The flask was full of slightly pink gel, which significantly increased the solution viscosity. It was very difficult to precipitate the solid and also difficult to filter the solid and dry it. The filtration speed was very slow. After filtration and washes with toluene and isohexane, the slightly pink solid was dried under vacuum at room temperature for 5 hours. Analytical results showed Al=16.6% (after solvent correction), toluene=39.89% and isohexane=1.66%. The particles were chunky, showing a significant amount of non-spherical, >5 mm (or 5000 μm) particles. This product was not carried on for catalyst preparation because of poor particle distributions and difficult handling of the glassy material.

Example 7 (Comparative)

Activator Preparation

The support material was not contacted first with an organoaluminum compound. In this Example, the aluminoxane and polyfunctional compound were added separately. In the drybox in a $N_2$ atmosphere, silica gel (5 g, calcined at 140° C. for 2 hrs, P-10, Fuji Silysia Chemical Ltd.) was slurried in 50 mL toluene. To the slurry MAO solution (12.908 g, 30%) was slowly added. After stirring the mixture at room temperature for 30 min, Ethanox® 330 antioxidant (13.048 g, of 20%) was slowly added. The slurry gradually became pink during the Ethanox® 330 antioxidant addition. The slurry was stirred at room temperature for 1 hour. The temperature was then brought to 120° C. When temperature reached around 85° C., a pink gel started forming and the slurry became more viscous. After heating the slurry at 120° C. for 2 hours, the slurry became less pink in color. The preparation was stopped due to the formation of the gel. This gel (the reaction product of Ethanox® 330 antioxidant and MAO), has been found to trap a large amount of toluene which was then difficult to remove by ambient vacuum drying. In addition, the solid gel-like product tended to form tightly bound chunks, which were difficult to break apart, showing a significant amount of non-spherical, >5 mm (or 5000 μm) particles. This gel was not carried on for catalyst preparation because of poor particle distributions and difficult handling of the glassy material.

Example 8

Polymerization

Catalysts prepared according to Examples 1-5 were used in polymerizations of ethylene with 1-hexene. Polymerizations were conducted in a 4 L reactor. The dried 4 L reactor was heated to 80° C. under low-pressure nitrogen flow. The reactor was pressured with isobutane and vented three times to remove nitrogen. After 1000 ml of isobutane was charged into the reactor, the reactor agitator was set at 800 rpm. After the temperature stabilized, ethylene was charged into the reactor up to 320 psi ($2.21 \times 10^6$ Pa). Next, 40 mL of dried 1-hexene as comonomer was charged, followed by 500 mL of isobutane. Then 2 mL of 10% tri(isobutyl)aluminum (TIBA) in isohexane or hexane was added as scavenger. An amount of solid catalyst (see Table 1) prepared as in one of the Examples above was slurried in 2 mL of hexane in a glovebox and then injected into the reactor, followed by another 500 mL of isobutane. The reaction pressure was maintained at 320 psi and the reaction was conducted for at 80° C. for 60 minutes, after which the reaction was stopped and isobutane was vented. The polymer was dried and weighed.

The resin morphologies are indicated by measurement of polymer fouling degree of the reactor. The reactor fouling degree is divided into 6 scales, from zero to 5, as follows:

5=sheeting material formed on the wall and stirrer of the reactor,
4=up to 70 wt % resins with particle sizes over 2 mm,
3=up to 40 wt % resins with particle sizes over 2 mm,
2=up to 20 wt % resins with particle sizes over 2 mm,
1=up to 10 wt % resins with particle sizes over 2 mm, and
0=up to 1 wt % resins with particle sizes over 2 mm.

Materials used in the preparation of the catalysts are summarized in Table 1. Results of the polymerizations are summarized in Table 2. A set of sieving devices with 2 mm as the largest sieve size was used to measure the resin particle size distribution. The degree of reactor fouling is reported in Table 2. The polymerization productivity of the catalyst in each run was calculated, and is listed in Table 2.

TABLE 1

|  | Silica in prep | Ethanox® 330 antioxidant in prep | Silica first contacted w/ organo-Al cpd. | Catalyst PSD[1] |
|---|---|---|---|---|
| Examples of the invention | | | | |
| 1 | yes | yes | Yes | 3 to 120 μm |
| 1 | yes | yes | Yes | 3 to 120 μm |
| 2 | yes | yes | Yes | 6 to 70 μm |
| 3 | yes | yes | Yes | 6 to 60 μm |
| Comparative Examples | | | | |
| 4 | yes | no | No | 6 to 60 μm |
| 4 | yes | no | No | 6 to 60 μm |
| 5 | no | yes | N/A | 0.3 to 2000 μm |
| 6 | yes | yes | No | Large amt. > 5000 μm |
| 7 | yes | yes | No | Large amt. > 5000 μm |

[1]PSD = particle size distribution.

TABLE 2

|  | Amount Al | Catalyst charge | Catalyst productivity | | Reactor fouling |
|---|---|---|---|---|---|
| Catalyst prep Ex. | | | | | |
| 1 | 27% | ~40 mg | 16,800 | g polymer/ g cat/hr | 2 |
| 1 | 27% | ~20 mg | 22,000 to 24,000 | g polymer/ g cat/hr | 1 |
| 2 | 25% | ~20 mg | 20,000 to 23,000 | g polymer/ g cat/hr | 0 |
| 3 | 18% | ~10 mg | 24,400 to 24,900 | g polymer/ g cat/hr | 0 |
| Comparative catalyst prep Ex. | | | | | |
| 4 | 17% | ~40 mg | 5,600 | g polymer/ g cat/hr | 0 |
| 4 | 17% | ~20 mg | 7,000 | g polymer/ g cat/hr | 0 |
| 5 | 23% | ~40 mg | 10,000 to 12,000 | g polymer/ g cat/hr | 5 |
| 6 | 17% | | No catalyst preparation due to chunky particles | | |
| 7 | 17%[1] | | No catalyst preparation due to chunky particles | | |

[1]Estimated based on Example 6.

The polymerization results for the catalysts prepared according to the inventive Examples (1-3) show the effect of the addition sequence of the four components of the inventive activator compositions as in Examples 1-3 (support, polyfunctional compound, organoaluminum compound, and aluminoxane) on the catalyst particle size distribution (PSD) and the extent of reactor fouling. The polymerization results for the catalysts prepared according to the comparative Examples (4-7) show that the absence of components of the inventive activator compositions, such as the support material or the polyfunctional compound, results in either poor catalyst performance or significant reactor fouling.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition.

As used herein, the term "concurrently" does not imply that the feeds must start at exactly the same time or that they must stop at exactly the same period of time. Rather, the term is used in the sense that during substantially the entire feeding period, the designated feeds are being maintained. It should also be understood that while these concurrent feeds are preferably continuous concurrent feeds, slight interruptions in a feed are acceptable provided that the duration of the interruption is sufficiently small as to cause no material disruption in the reaction. Thus as used herein, the term "concurrently" should be understood to embrace the minor departures just referred to.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

Each and every patent or other publication or published document referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. An activator precursor composition which comprises
   i) a support material in contact with an organoaluminum compound, and
   ii) a polyfunctional compound which has at least two aromatic groups in which at least two of said aromatic groups each has at least one polar monoprotic group thereon.

2. An activator composition which comprises an aluminoxane and a composition of claim 1.

3. A composition as in claim 2 which has one or more of the following features:
   the support material is silica, alumina, or silica-alumina;
   the organoaluminum compound is trimethylaluminum, tri-n-propylaluminum, tri-n-butylaluminum, or tri(isobutyl)aluminum;
   the polar monoprotic groups of the polyfunctional compound are hydroxy groups, thiol groups, or secondary amino groups.

4. A composition as in any claim 2 which has one or more of the following features:
   the organoaluminum compound is trimethylaluminum;
   the support material is silica;
   the polar monoprotic groups of the polyfunctional compound are hydroxy groups.

5. A composition as in claim 4 wherein the polyfunctional compound is 4,4'-ethylenediphenol, 4,4'-methylenebis(2,6-di(tert-butyl)-phenol), or 1,3,5-trimethyl-2,4,6-tris(3,5-di(tert-butyl)-4-hydroxybenzyl)benzene.

6. A composition as in claim 2 wherein the organoaluminum compound has the formula

where Al is aluminum;
R is a hydrogen atom or group bound to aluminum via a carbon atom;
Z is an atom other than hydrogen or a group that is bound to aluminum via an atom other than carbon; and
f is a number from 2 to 3.

7. A composition as in claim 2 wherein the polyfunctional compound is represented by the formula

where E is an organic moiety, an atom, or a bond;
Ar is an aromatic moiety;
J is a polar atom or a polar group;
H is a hydrogen atom; and
g is an integer equal to or greater than 2.

8. A composition as in claim 2 wherein the aluminoxane is methylaluminoxane, ethylaluminoxane, n-butylaluminoxane, or iso-butylaluminoxane.

9. A composition as in claim 8 wherein the aluminoxane is methylaluminoxane and/or wherein the polyfunctional compound is 4,4'-ethylenediphenol, 4,4'-methylenebis(2,6-di(tert-butyl)-phenol), or 1,3,5-trimethyl-2,4,6-tris(3,5-di(tert-butyl)-4-hydroxybenzyl)benzene.

10. A process for forming an activator precursor composition, which process comprises bringing together, in an inert, anhydrous environment,
    i) a support material in contact with an organoaluminum compound, and
    ii) a polyfunctional compound which has at least two aromatic groups in which at least two of said aromatic groups each has at least one polar monoprotic group thereon,
    such that an activator precursor composition is formed.

11. A process for forming an activator composition, which process comprises, in an inert, anhydrous environment,
    i) forming an organoaluminum-treated support by contacting a support material and an organoaluminum compound,
    ii) contacting said organoaluminum-treated support either
        a) with a polyfunctional compound which has at least two aromatic groups in which at least two of said aromatic groups each has at least one polar monoprotic group thereon, forming a mixture, and then contacting said mixture with an aluminoxane, or
        b) with an aluminoxane, forming a mixture, and then contacting said mixture with a polyfunctional compound which has at least two aromatic groups in which at least two of said aromatic groups each has at least one polar monoprotic group thereon, or
        c) with a portion of a polyfunctional compound, forming a first mixture, contacting said first mixture with the aluminoxane, forming a second mixture, and contacting said second mixture with more polyfunctional compound,
    wherein said polyfunctional compound has at least two aromatic groups in which at least two of said aromatic groups each has at least one polar monoprotic group thereon,
    such that an activator composition is formed.

12. A process as in claim 11 wherein said organoaluminum-treated support is contacted with the polyfunctional compound and the aluminoxane sequentially.

13. A process as in claim 10 wherein R of the organoaluminum compound is in a molar ratio of about 1:1 or more relative to the polar monoprotic groups of the polyfunctional compound.

14. A process as in claim 11 wherein the aluminoxane is methylaluminoxane and/or wherein the polyfunctional compound is 4,4'-ethylenediphenol, 4,4'-methylenebis(2,6-di(tert-butyl)-phenol), or 1,3,5-trimethyl-2,4,6-tris(3,5-di(tert-butyl)-4-hydroxybenzyl)benzene.

15. A process as in claim 11 wherein
    the support material and the organoaluminum compound are brought together to form a first mixture;
    the polyfunctional compound is combined with the first mixture to form a second mixture; and
    the aluminoxane is combined with the second mixture.

16. A catalyst composition formed from interaction between an activator composition of claim 2 and at least one catalyst compound or complex of a transition metal, lanthanide metal, or actinide metal.

17. A catalyst composition as in claim 16 wherein said catalyst compound or complex is a metallocene.

18. A process for olefin polymerization, which process comprises polymerizing at least one polymerizable olefinic monomer in the presence of a catalyst composition of claim 16, to form a polyolefin polymer.

* * * * *